(12) United States Patent
Yuan et al.

(10) Patent No.: US 12,553,781 B2
(45) Date of Patent: Feb. 17, 2026

(54) PIEZOELECTRIC AND TRIBOELECTRIC ACTIVATED FOAM SENSORS AND APPLICATIONS

(71) Applicant: SmartFoam, LLC, Carlsbad, CA (US)

(72) Inventors: Wei Yuan, Los Angeles, CA (US); Dave Jabson, San Marcos, CA (US); Jeff Slosar, Rancho Santa Fe, CA (US); Sean Clottu, Ladera Ranch, CA (US); Peter Curley, Carlsbad, CA (US); Joel White, Fallbrook, CA (US); Michael Davis, San Diego, CA (US)

(73) Assignee: SmartFoam Inc., Carlsbad, CA (US)

( * ) Notice: Subject to any disclaimer, the term of this patent is extended or adjusted under 35 U.S.C. 154(b) by 886 days.

(21) Appl. No.: 17/423,067

(22) PCT Filed: Jan. 14, 2020

(86) PCT No.: PCT/US2020/013552
§ 371 (c)(1),
(2) Date: Jul. 14, 2021

(87) PCT Pub. No.: WO2020/150269
PCT Pub. Date: Jul. 23, 2020

(65) Prior Publication Data
US 2022/0099504 A1 Mar. 31, 2022

Related U.S. Application Data

(60) Provisional application No. 62/792,860, filed on Jan. 15, 2019.

(51) Int. Cl.
*G01L 1/16* (2006.01)
*A43B 3/34* (2022.01)
(Continued)

(52) U.S. Cl.
CPC .............. *G01L 1/16* (2013.01); *A43B 3/34* (2022.01); *A61B 5/6807* (2013.01); *H10N 30/092* (2023.02); *H10N 30/302* (2023.02)

(58) Field of Classification Search
CPC .. G01L 1/16; G01L 5/167; A43B 3/34; A61B 5/6807; H10N 30/092; H10N 30/302; H10N 30/045; H10N 30/852
See application file for complete search history.

(56) References Cited

U.S. PATENT DOCUMENTS

2008/0233277 A1    9/2008 Kubota et al.
2010/0294976 A1*  11/2010 Ajayan .................. H10N 30/30
                                                          977/773
(Continued)

OTHER PUBLICATIONS

Cheng et al, "Boosted Mechanical Piezoelectric Energy Harvesting of Polyvinylidene Fluoride/Barium Titanate Composite Porous Foam based on Three-Dimensional Printing and Foaming Technology", ACS Omega 2021, 6, pp. 30769-30778 (Year: 2021).*

(Continued)

*Primary Examiner* — Emily P Pham
(74) *Attorney, Agent, or Firm* — Greer, Burns & Crain, Ltd

(57) ABSTRACT

A footwear component is disclosed. In various embodiments, the footwear component includes a foam substrate having an upper surface and a lower surface extending in a lateral direction; and a sensing circuit between the upper surface and the lower surface, the sensing circuit including a piezoelectric foam sensor including a piezoelectric foam between a plurality of electrodes, a printed circuit board having a processor electrically connected to the plurality of electrodes by one or more electrical leads, and an antenna electrically connected to the printed circuit board, the antenna being spaced apart from the printed circuit board and the plurality of electrodes in the lateral direction.

19 Claims, 30 Drawing Sheets

(51) Int. Cl.
  *A61B 5/00* (2006.01)
  *H10N 30/092* (2023.01)
  *H10N 30/30* (2023.01)

(56) References Cited

U.S. PATENT DOCUMENTS

| | | |
|---|---|---|
| 2014/0260653 A1 | 9/2014 | Merrell et al. |
| 2014/0333184 A1 | 11/2014 | Wang et al. |
| 2015/0134061 A1 | 5/2015 | Friis et al. |
| 2016/0181506 A1 | 6/2016 | Sirbuly et al. |
| 2019/0252599 A1* | 8/2019 | Sirbuly ............... H10N 30/852 |
| 2019/0379300 A1* | 12/2019 | Cao ..................... H10N 30/073 |
| 2020/0235281 A1* | 7/2020 | Markanday .......... H10N 30/206 |
| 2021/0234089 A1* | 7/2021 | Zheng .................. H10N 30/092 |

OTHER PUBLICATIONS

International Preliminary Report on Patentability dated Jun. 16, 2021 in corresponding International Application No. PCT/US2020/013552 filed Jan. 14, 2020; total 7 pages.

International Search Report dated May 14, 2020 in corresponding International Application No. PCT/US2020/013552 filed Jan. 14, 2020; total 4 pages.

Written Opinion of the International Searching Authority dated May 14, 2020 in corresponding International Application No. PCT/US2020/013552 filed Jan. 14, 2020; total 6 pages.

* cited by examiner

FRONT VIEW     BACK VIEW     INSIDE VIEW

PIEZOELECTRIC AND TRIBOELECTRIC ACTIVATED FOAM SENSORS AND APPLICATIONS

CROSS-REFERENCE TO RELATED APPLICATIONS

The present application is a U.S. National Stage entry under 35 U.S.C. § 371 of International Application No. PCT/US2020/013552, entitled "Piezoelectric and Triboelectric Activated Foam Sensors and Applications," filed Jan. 14, 2020, which claims priority to U.S. Prov. Appl. 62/792,860, entitled "Piezoelectric and Triboelectric Activated Foam Sensors and Applications in Human Step Detection and Step Analytics," filed Jan. 15, 2019, the entirety of each of which is incorporated herein by reference for all purposes.

FIELD

The present disclosure relates generally to methods and apparatus for measuring forces or strains and, more particularly, to piezoelectric and triboelectric foam-based sensors configured for motion related measurements of forces or strains.

BACKGROUND

Sensors enabling measurement of motion or activity have generated recent interest, particularly with the advent of the Internet of Things (IoT). For example, there is current interest in using sensors configured to detect temperature, pressure, strains or movement to gather and store data relating to myriad diverse applications, such as, for example, travel, health, and home security. The expansive use of wireless connections and connectivity has contributed to the current interest in exploiting sensors to monitor or control various complex systems, including specific aspects of the human body. Sensors that may be implemented in products using existing manufacturing processes are also of great interest, allowing new capabilities to be offered by manufacturers in products not traditionally known for including sensors.

SUMMARY

A first piezoelectric foam is disclosed. In various embodiments, the piezoelectric foam includes a porous polymer matrix; and a plurality of piezoelectric particles in the porous polymer matrix, where a filler weight of the plurality of piezoelectric particles is a majority of a combined weight of the plurality of piezoelectric particles and the porous polymer matrix. In various embodiments, the plurality of piezoelectric particles has a piezoelectrical structure and a size in a range of 100 nanometers to 100 micrometers. In various embodiments, the plurality of piezoelectric particles comprises barium titanate microparticles. In various embodiments, the filler weight is greater than 65% of the combined weight. In various embodiments, the filler weight is less than 65% of the combined weight. In various embodiments, the filler weight is in a range of 51% to 65% of the combined weight. In various embodiments, the piezoelectric foam is an electrical insulator.

A second piezoelectric foam is disclosed. In various embodiments, the piezoelectric foam includes a porous polymer matrix; and a plurality of piezoelectric particles in the porous polymer matrix, where the plurality of piezoelectric particles has a tetragonal crystal lattice structure and a size in a range of 200 to 500 nanometers. In various embodiments, a filler weight of the plurality of piezoelectric particles is less than 50% of a combined weight of the plurality of piezoelectric particles and the porous polymer matrix. In various embodiments, the filler weight is less than 30% of the combined weight. In various embodiments, the filler weight is less than 20% of the combined weight.

A pressure sensing component is disclosed. In various embodiments, the pressure sensing component includes a piezoelectric foam having a porous polymer matrix; and a plurality of piezoelectric particles in the porous polymer matrix, wherein the plurality of piezoelectric particles has a tetragonal crystal lattice structure and a size in a range of 200 to 500 nanometers.

A footwear component is disclosed. In various embodiments, the footwear component includes a piezoelectric foam having a porous polymer matrix; and a plurality of piezoelectric particles in the porous polymer matrix, wherein the piezoelectric foam has a piezoelectric coefficient greater than 1 pC/N. In various embodiments, the piezoelectric coefficient is less than 50 pC/N. In various embodiments, the piezoelectric coefficient is less than 20 pC/N. In various embodiments, the piezoelectric coefficient is less than 10 pC/N.

A first method is disclosed. In various embodiments, the method includes mixing a plurality of piezoelectric particles into a polymer matrix; forming pores in the polymer matrix to form a piezoelectric foam precursor, wherein a filler weight of the plurality of piezoelectric particles is a majority of a total weight of the piezoelectric foam precursor; and applying an electric field and a poling temperature to the piezoelectric foam precursor for a period of time to form a piezoelectric foam having a piezoelectric coefficient of greater than 1 pC/N. In various embodiments, the piezoelectric coefficient is less than 50 pC/N. In various embodiments, the piezoelectric coefficient is less than 20 pC/N. In various embodiments, the piezoelectric coefficient is less than 10 pC/N. In various embodiments, the electric field is greater than 10 kV/mm. In various embodiments, the electric field is less than 10 kV/mm. In various embodiments, the electric field is less than 5 kV/mm. In various embodiments, the electric field is less than 2 kV/mm. In various embodiments, the period of time is 5 hours or less. In various embodiments, the period of time is 3 hours or less. In various embodiments, the period of time is less than 1 hour. In various embodiments, the poling temperature is less than 150 degrees Celsius. In various embodiments, the poling temperature is less than 130 degrees Celsius. In various embodiments, the poling temperature is less than 120 degrees Celsius. In various embodiments, the filler weight is greater than 65% of the total weight. In various embodiments, the filler weight is less than 65% of the total weight. In various embodiments, the filler weight is in a range of 51% to 65% of the total weight.

A second method is disclosed. In various embodiments, the method includes mixing a plurality of piezoelectric particles into a polymer matrix; forming pores in the polymer matrix to form a piezoelectric foam precursor; and applying an electric field and a poling temperature to the piezoelectric foam precursor for a period of time to form a piezoelectric foam having a piezoelectric coefficient of less than 100 pC/N. In various embodiments, a filler weight of the plurality of piezoelectric particles is less than 50% of a total weight of the piezoelectric foam precursor. In various embodiments, the filler weight is less than 30% of the total weight. In various embodiments, the filler weight is less than 20% of the total weight.

A footwear component is disclosed. In various embodiments, the footwear component includes a foam substrate having an upper surface and a lower surface extending in a lateral direction; and a sensing circuit between the upper surface and the lower surface, wherein the sensing circuit includes: a piezoelectric foam sensor including a piezoelectric foam between a plurality of electrodes; a printed circuit board having a processor electrically connected to the plurality of electrodes by one or more electrical leads; and an antenna electrically connected to the printed circuit board. In various embodiments, a first thickness of the foam substrate between the upper surface and the lower surface at the antenna is less than a second thickness of the foam substrate at the printed circuit board. In various embodiments, the footwear component is a sole of a shoe. In various embodiments, the footwear component is a shoe insert. In various embodiments, the processor is configured to communicate data wirelessly via the antenna and the antenna is spaced apart from the printed circuit board and the plurality of electrodes in the lateral direction.

A porous nanoparticle-polymer composite structure is disclosed. In various embodiments, the composite structure includes a foam substrate comprising a polymeric material; and a plurality of piezoelectric nanoparticles distributed throughout the foam substrate, wherein the porous nanoparticle-polymer composite structure is cured into a shape from a mixture including a curable liquid polymer, water and the plurality of piezoelectric nanoparticles. In various embodiments, the plurality of piezoelectric nanoparticles comprise barium titanate nanoparticles having a diameter equal to or greater than about 100 nm. In various embodiments, the polymeric material is formed from a two-part polyurethane system that includes a polyol component and the water is between about 0.1% and about 0.9% by a weight of the plurality of the polyol component. In various embodiments, the plurality of piezoelectric nanoparticles is about 60% of a total weight of the porous nanoparticle-polymer composite structure. In various embodiments, the porous nanoparticle-polymer composite structure has a signal increase of greater than about 13% compared to a similar composite structure that does not include the water. In various embodiments, the porous nanoparticle-polymer composite structure has a signal increase of between about 13% and about 80% compared to a similar composite structure that does not include the water.

A first piezoelectric sensor is disclosed. In various embodiments, the sensor includes a piezoelectric foam having an upper surface and a lower surface; and a preload mechanism mounted on the piezoelectric foam to apply a preload force to the upper surface and the lower surface. In various embodiments, the preload force is a compressive force normal to the upper surface. In various embodiments, the preload mechanism includes an upper portion mounted on the upper surface, a lower portion mounted on the lower surface, and a coupling to join the upper portion to the lower portion. In various embodiments, the preload mechanism surrounds the piezoelectric foam.

A second piezoelectric sensor is disclosed. In various embodiments, the sensor includes a piezoelectric foam having an upper surface, a lower surface, and a sidewall extending from the upper surface to the lower surface, wherein the piezoelectric foam includes a plurality of piezoelectric microparticles in a porous polymer matrix; an upper electrode mounted on the upper surface, wherein the upper electrode has a first shape and a first size; and a lower electrode mounted on the lower surface, wherein the lower electrode has a second shape and a second size. In various embodiments, the first shape and the second shape are the same. In various embodiments, the first size and the second size are the same such that the sidewall extends vertically from the upper surface to the lower surface. In various embodiments, the piezoelectric sensor is disc-shaped. In various embodiments, the first size and the second size are different such that the sidewall tapers from the upper surface to the lower surface. In various embodiments, the piezoelectric sensor is frustoconical-shaped. In various embodiments, the first shape and the second shape are different.

A third piezoelectric sensor is disclosed. In various embodiments, the sensor includes a piezoelectric foam including an upper surface having a shape of a foot sole that includes a toe region and a heel region, and a lower surface, wherein the piezoelectric foam includes a plurality of piezoelectric microparticles in a porous polymer matrix; an upper electrode array mounted on the upper surface, wherein the upper electrode array includes upper electrodes having respective shapes and sizes, and wherein the plurality of upper electrodes are laterally spaced from each other across the upper surface; and one or more lower electrodes mounted on the lower surface. In various embodiments, one or more of the plurality of upper electrodes have a triangle shape including a triangle base in the heel region and a triangle peak in the toe region. In various embodiments, the plurality of upper electrodes is interconnected by one or more electrode leads. In various embodiments, the upper electrode shapes are different. In various embodiments, the one or more lower electrodes includes a lower electrode extending laterally below the plurality of upper electrodes.

A piezoelectric-triboelectric sensor is disclosed. In various embodiments, the sensor includes an upper electrode; a lower electrode; and a piezoelectric-triboelectric foam between the upper electrode and the lower electrode, wherein the piezoelectric-triboelectric foam includes a porous polymer matrix having a filled region laterally offset from a non-filled region, wherein the filled region includes a plurality of piezoelectric microparticles in the porous polymer matrix and the non-filled region has no piezoelectric microparticles in the porous polymer matrix. In various embodiments, a piezoelectric sensor is stacked with the piezoelectric-triboelectric sensor, wherein the piezoelectric sensor includes a piezoelectric foam including a second plurality of piezoelectric microparticles in a second porous polymer matrix. In various embodiments, the plurality of piezoelectric microparticles is poled in a first direction, and the second plurality of piezoelectric microparticles is poled in a second direction different than the first direction. In various embodiments, the porous polymer matrix has a first stiffness, and the second porous polymer matrix has a second stiffness different than the first stiffness.

A pair of shoes is disclosed. In various embodiments, the pair of shoes includes a first shoe including a first piezoelectric sensor and a first wireless transceiver coupled to a first processor; and a second shoe including a second piezoelectric sensor and a second wireless transceiver coupled to a second processor; wherein the first shoe and the second shoe communicate data via the wireless transceivers, and wherein the data includes impact event data generated by one or more of the processors. In various embodiments, the processors are configured to use the wireless transceivers to communicate via one or more of Bluetooth, ZigBee, ANT+, low power Bluetooth, or Li-Fi wireless communication protocols.

An input device is disclosed. In various embodiments, the input device includes a piezoelectric foam having a porous polymer matrix containing a first piezoelectric region having a first plurality of piezoelectric microparticles in the porous polymer matrix and a second piezoelectric region having a second plurality of piezoelectric microparticles in the porous polymer matrix. In various embodiments, a first ratio of a first filler weight of the first plurality of piezoelectric microparticles to a first total weight of the first piezoelectric region is different than a second ratio of a second filler weight of the second plurality of piezoelectric microparticles to a second total weight of the second piezoelectric region. In various embodiments, one or more upper electrodes is mounted on an upper surface of the piezoelectric foam over the first piezoelectric region and the second piezoelectric region. In various embodiments, the one or more upper electrodes includes an upper electrode array including a plurality of upper electrodes having respective shapes and sizes, and the plurality of upper electrodes is laterally spaced from each other across the upper surface.

A device is disclosed. In various embodiments, the device includes a device housing having a housing wall; and a pushbutton mounted on the housing wall, wherein the pushbutton includes a piezoelectric foam including a plurality of piezoelectric microparticles in a porous polymer matrix, wherein a filler weight of the plurality of piezoelectric microparticles is a majority of a total weight of the piezoelectric foam. In various embodiments, the housing wall includes a lateral edge extending around a perimeter of a display, and the pushbutton is mounted on the lateral edge.

The foregoing features and elements may be combined in any combination, without exclusivity, unless expressly indicated herein otherwise. These features and elements, as well as the operation of the disclosed embodiments, will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
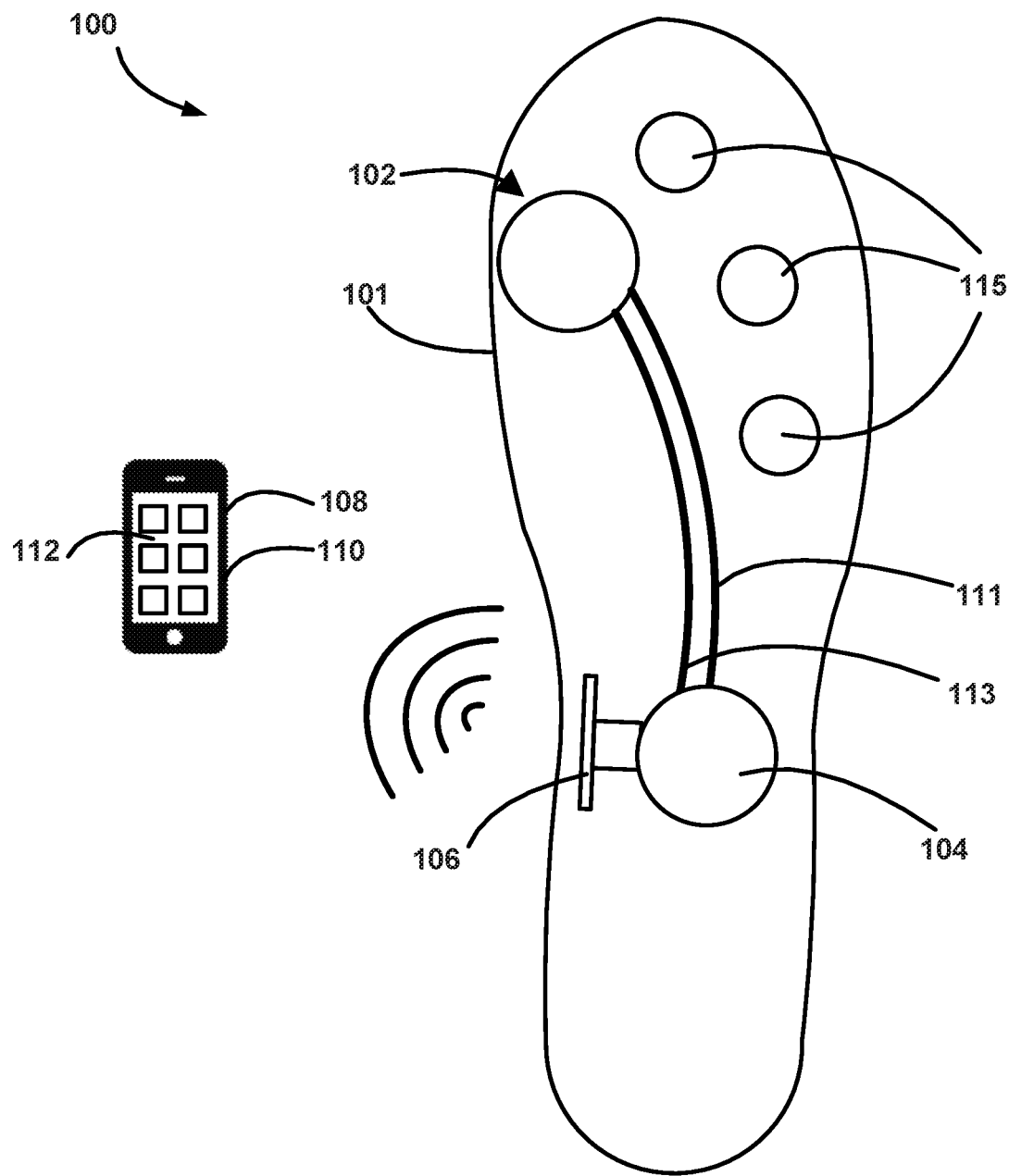
FIGS. 1A, 1B, 1C, 1D and 1E illustrate systems configured to detect and process an applied force and to communicate data reflective of the applied force and relative positioning of components within the systems, in accordance with various embodiments.
Figure 1B:
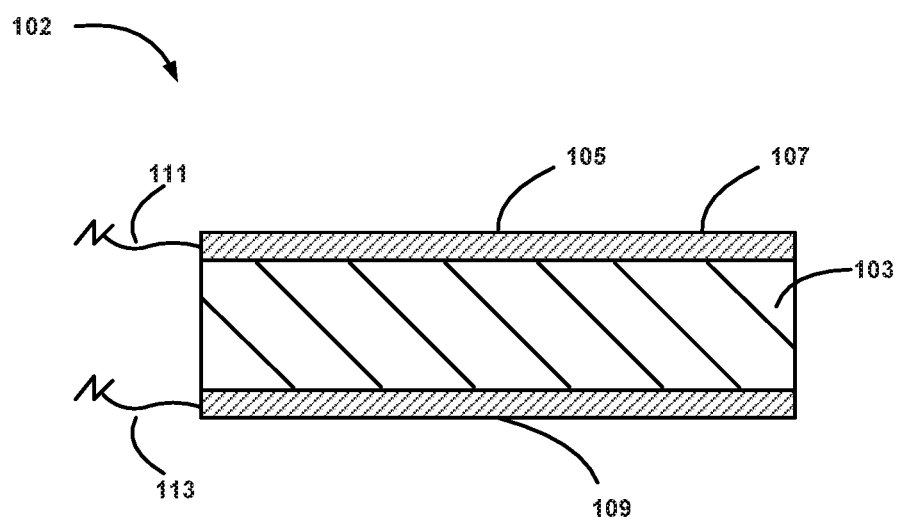
Figure 1C:
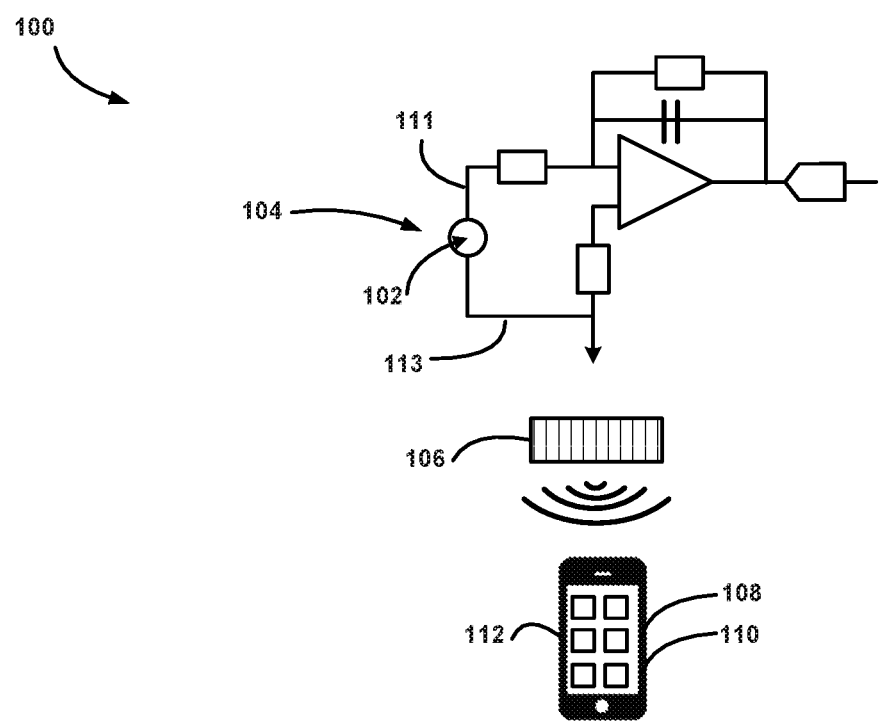

Referring now to the drawings, FIGS. 1A, 1B and 1C illustrate a system 100 that includes a sensor 102 configured to output an electric signal in response to an applied force, a processor 104 (or circuitry) configured to process the electric signal into a force signal (or force data) and a transmitter 106 (or an antenna) configured to transmit the force signal to a receiver 108, after which the force signal is further processed or otherwise received by a device 110 running an application software. In various embodiments and as discussed in more detail below, the sensor 102 includes a foam layer 103 that itself comprises one or more of a piezoelectric foam, a triboelectric foam or a tribo-piezoelectric foam. In various embodiments, the sensor 102 includes an electrode 105 in electrical communication with the foam layer 103. In various embodiments, the sensor 102 may include a first electrode 107 and a second electrode 109 that sandwich the foam layer 103, with the first electrode connected to the processor 104 via a first conductor 111 and the second electrode 109 connected to the processor 104 via a second conductor 113.

In various embodiments, the sensor 102 is implemented in a shoe 101 (or in a footwear component thereof, such as, for example, a sole or a shoe insert) for footstep detection and analysis or basic step counting. For example, the sensor 102 or, more particularly, the foam layer 103 includes a piezoelectric foam or a triboelectric foam that is formed as part of the shoe 101, either during or following manufacture of the shoe 101, the former enabling ease of implementation during manufacture and reduced cost. The force or load detected by the sensor 102 may be applied directly to a surface of the sensor 102 or, in various embodiments, to an intervening layer of material—e.g., to one of an outsole, an insole or a footbed of the shoe 101—in connection with the sensor 102. In various embodiments, the sensor 102 may comprise a range of foam formulations and additives providing different signal generating properties or values for hardness, stiffness, porosity, etc. During fabrication, the foam formulations may be mixed, molded to a desired shape, and then cured. In various embodiments, the final shape of the sensor 102 or the foam layer 103 is tailored to improve the mechanical coupling of the loads measured by the sensor 102—e.g., the sensor 102 or the foam layer 103 is generally flat and thin so as to fit within a sole (or an insole) of the shoe 101 and detect loads applied in a direction substantially normal to the flat surface of the sensor 102.

In various embodiments, the electrode 105 (or a plurality of electrodes) is attached to the sensor 102 or, more specifically, to the foam layer 103 that comprises the sensor 102. The electrode 105 may be bonded to the foam layer 103 via a glue or an adhesive, be embedded into or onto the foam layer 103 during a curing process, or be screen printed directly onto the foam layer 103. In various embodiments, the sensor 102 may be attached by the first conductor 111 or by the second conductor 113 or by some other suitable conductor to the processor 104, which may comprise a flexible supporting electronics package, a printed circuit board or other suitable circuitry. In various embodiments, an array of sensors (e.g., a plurality of sensors 115 that includes the sensor 102 described above) may be employed to provide individual pressure or load measurements across an area or region of interest, such that a desired spatial resolution may be achieved—e.g., a surface of a heel section or a toe section or even an entire sole of the shoe 101 may include the plurality of sensors 115 in order to resolve or integrate a plurality of load measurements across the surface.

Still referring to FIGS. 1A, 1B and 1C, the processor 104 is configured to perform various functions. For example, in various embodiments, the processor 104 is configured to receive an analog signal (e.g., a direct current voltage) from the sensor 102, the analog signal being representative of a load applied to the sensor 102. For detection of a single-event—e.g., a footstep taken by a user wearing the shoe 101—the processor 104 may interpret an occurrence of the single event where the analog signal exceeds a threshold voltage within a defined time period. In various embodiments, processing of the analog signal is enhanced using analog to digital conversion to enable detailed time resolution of measurements of load versus time. In various embodiments, the processor 104 is also configured to record and store data, which may be transmitted to the receiver 108 as a force signal. In various embodiments, transmission of the force signal to the receiver 108 occurs via a radio frequency or light-based communications protocol—e.g., Bluetooth®, Bluetooth Low Energy (BLE), WiFi™, and Zigbee standards or protocols. In various embodiments, the transmitter 106 (e.g., a Bluetooth antenna) is connected to the processor 104 and positioned to maximize transmission of the force signal to the receiver 108—e.g., the transmitter 106 is positioned toward a side or an edge of the sole of the shoe 101 to minimize interference or attenuation of the force signal from passing through various materials comprising the shoe 101. As illustrated in FIGS. 1A-1C, in various embodiments, the shoe 101 comprises a foam substrate having an upper surface and a lower surface extending in a longitudinal direction (e.g., from the heel to the toe) and a lateral direction. In various embodiments, a sensing circuit is disposed between the upper surface and the lower surface, the sensing circuit including a piezoelectric foam sensor disposed between a plurality of electrodes, a printed circuit board connected to the plurality of electrodes via one or more electrical leads and an antenna electrically connected to the printed circuit board. In various embodiments, the antenna is spaced apart from the printed circuit board in the lateral direction. In various embodiments, the processor 104 is configured to communicate data wirelessly via the transmitter 106 (or the antenna), and the data includes an impact event generated by the processor.

As discussed further below, the system 100 described herein is amenable to at least two modes of signal processing. In a first mode, the sensor 102 may be used as a single event detection device, where occurrence of the single event is detected following an analog signal exceeding a threshold value (e.g., voltage or current) within a defined time period. Here, the sensor 102 is configured to detect each occurrence where the analog signal exceeds the threshold value. Where multiple sensors are involved—e.g., the plurality of sensors 115 described above—the output of each sensor may be integrated (e.g., summed) over the spatial extent of the multiple sensors to determine an integrated value, which may then be compared to a threshold value to determine the occurrence of the single event. In various embodiments, multiple sensors may also be used to detect localized occurrences of events within the spatial area. For example, localized regions of high pressure within the sole of the shoe 101 may be detected through the use of multiple sensors. In a second mode, the sensor 102 is configured to digitize the analog signal, which enables construction of a profile (e.g., a digitized curve) of the event (e.g., a step of the shoe 101) as it occurs over time. Similar to the first mode, multiple sensors may be spatially distributed about an area or region of interest. For example, in various embodiments, the plurality of sensors 115 are spaced about the sole of the shoe 101 and configured to detect individual events and to digitize the signals from each localized area individually. Subsequent analysis may then provide detailed time/step/pressure information for different regions within the sole of the shoe 101. The detailed information may then be used to analyze walking characteristics such as, for example, gait, and to provide analysis of other health or athletic-performance related conditions that may be observed or detected through analysis of various manners of walking or running.

Finally, in various embodiments, the system 100 is configured to transmit the various forms of force signals—e.g., in the form of a threshold exceeding signal or pulse or a digitized profile—to the device 110 referred to above, where additional processing or storage may occur. In various embodiments, the device 110 may comprise a smartphone or a single or multi-purpose computing device having processing and storage capabilities. In various embodiments, the device 110 may comprise an application software module configured to present the force signals or results derived therefrom to a user. For example, the device 110 may include a display 112 configured to visually report an output to a user, where the output is reflective of a total number of steps taken during a period of time or some other, more detailed, analytics of the force signals. In various embodiments, the device 110 may also be configured to transmit the force signals or the analytics derived therefrom to subsequent devices (e.g., a home computer or digital assistant) or to locations accessible via the Internet (e.g., a cloud storage location or a website).

A broad range of data communication routes and techniques is contemplated. For example, radio frequency (RF) based systems (as well as light based LED communications such as LiFi) can be used to connect a single sensor-enabled shoe to wireless mobile devices, electronic assistants (e.g., Alex) or other Internet of Things devices. In addition, data communication is possible between multiple shoes (e.g., a pair of shoes including a first shoe and a second shoe, each having a processor and a transmitter and a foam sensor as described above) to provide step analytics or information from both shoes, and to provide a method of verifying step/activity synchronization (e.g., for dancing, gaming, etc.) for verifying a single person's ability to match to a required motion, and for synchronization with multiple people (e.g., actions in teams).

Figure 1D:
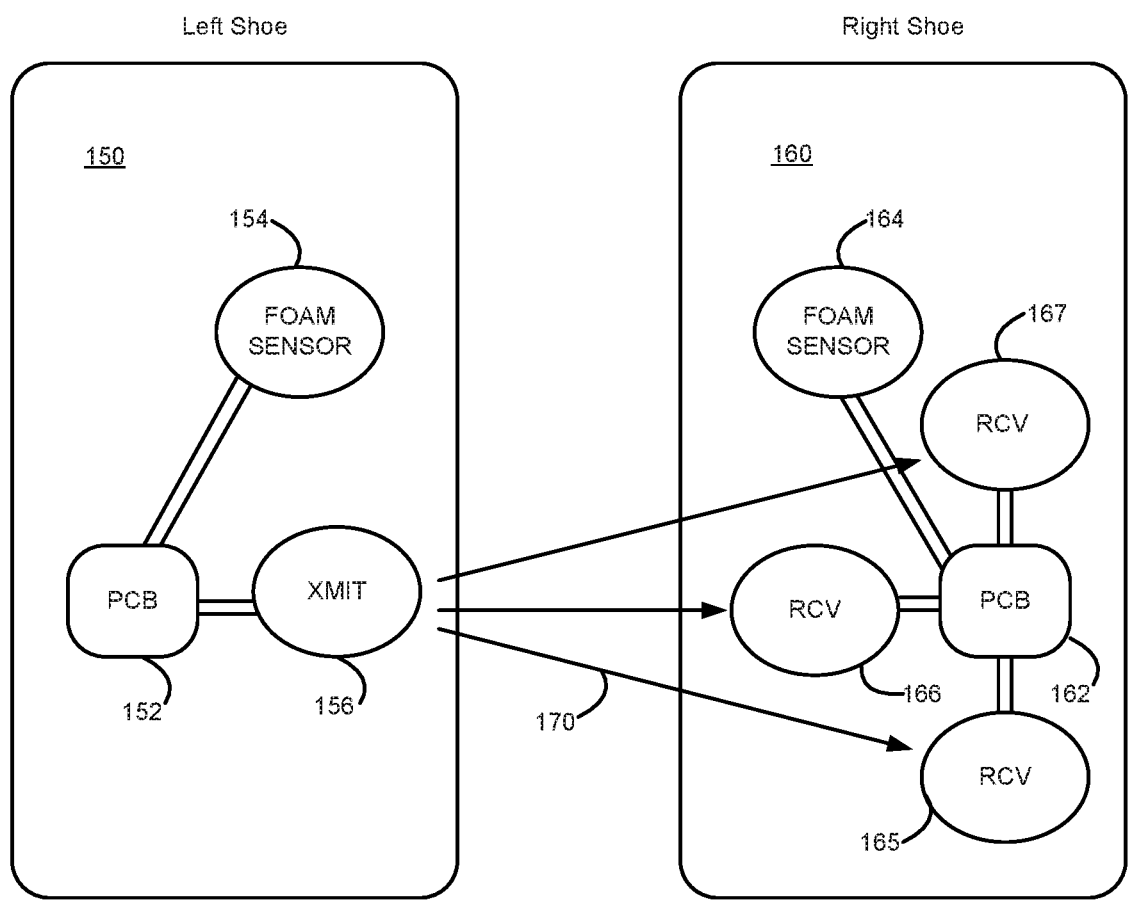
Figure 1E:
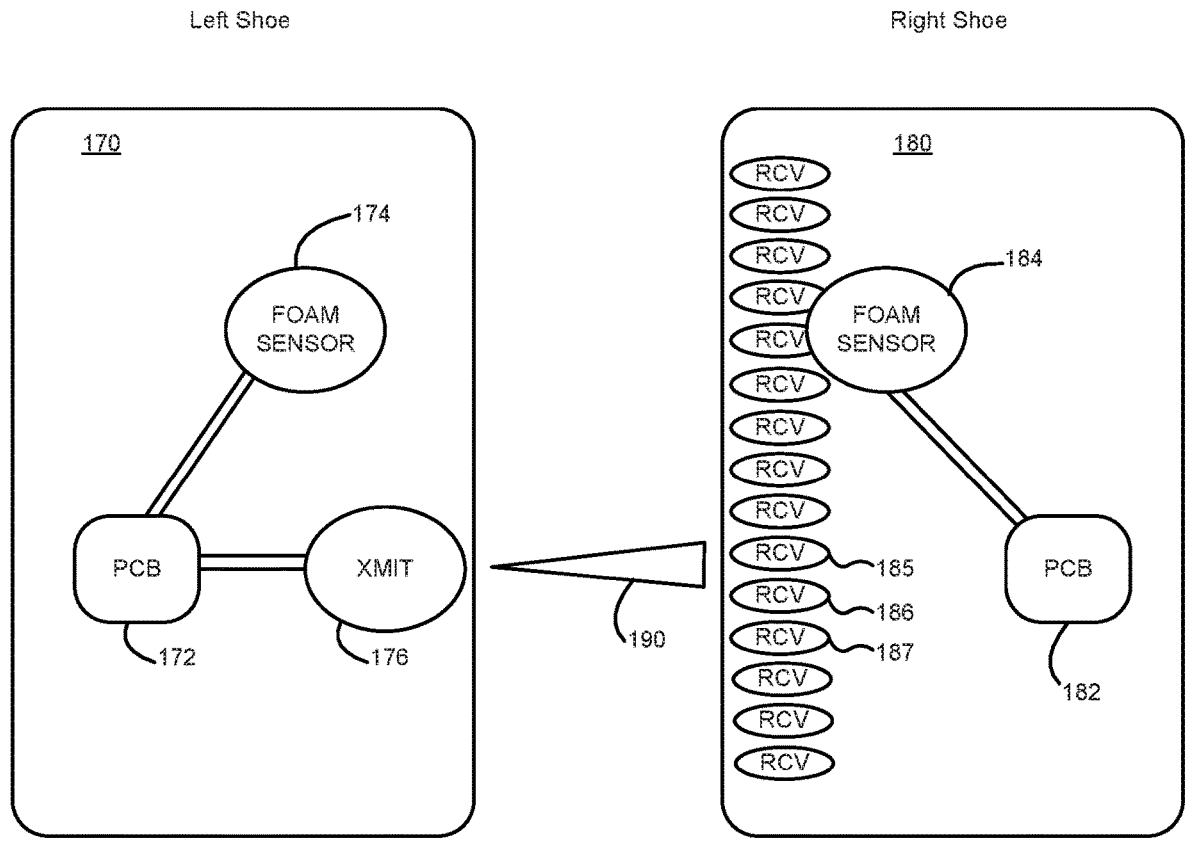

For example, referring to FIG. 1D a pair of shoes, including a left shoe 150 and a right shoe 160, is illustrated. The left shoe 150 includes a processor 152, a foam sensor 154 and a transmitter 156. The right shoe 160 includes a processor 162, a foam sensor 164 (or a pressure sensing component) and a receiver, which, in various embodiments, may comprise a first receiver 165, a second receiver 166 and a third receiver 167. During operation, the transmitter 156 is configured to transmit a signal 170 (e.g., a low frequency electromagnetic signal) that is detected by the receiver on the right shoe 160. In various embodiments, use of the first receiver 165, the second receiver 166 and the third receiver 167 facilitate triangulating the relative position of the left shoe 150 and the right shoe 160 (e.g., by measuring a phase difference of the signal received at each of the receivers). Similarly, referring to FIG. 1E a pair of shoes, including a left shoe 170 and a right shoe 180, is illustrated. The left shoe 170 includes a processor 172, a foam sensor 174 and a transmitter 176. The right shoe 180 includes a processor 182, a foam sensor 184 (or a pressure sensing component) and a receiver, which, in various embodiments, may comprise a first receiver 185, a second receiver 186 and a third receiver 187 (or any other number or receivers). During operation, the transmitter 176 is configured to transmit a signal 190 (e.g., an optical or light signal) that is detected by the receiver on the right shoe 180. In various embodiments, use of the first receiver 185, the second receiver 186 and the third receiver 187 facilitate triangulating the relative position of the left shoe 170 and the right shoe 180 (e.g., by measuring a phase difference of the signal received at each of the receivers). In various embodiments, both the left and the right shoes may comprise transmitters and receivers configured for bidirectional communication between the shoes. The signals transmitted by the shoes may include force data determined by the sensors as well as data used to determine position.

Figure 2:
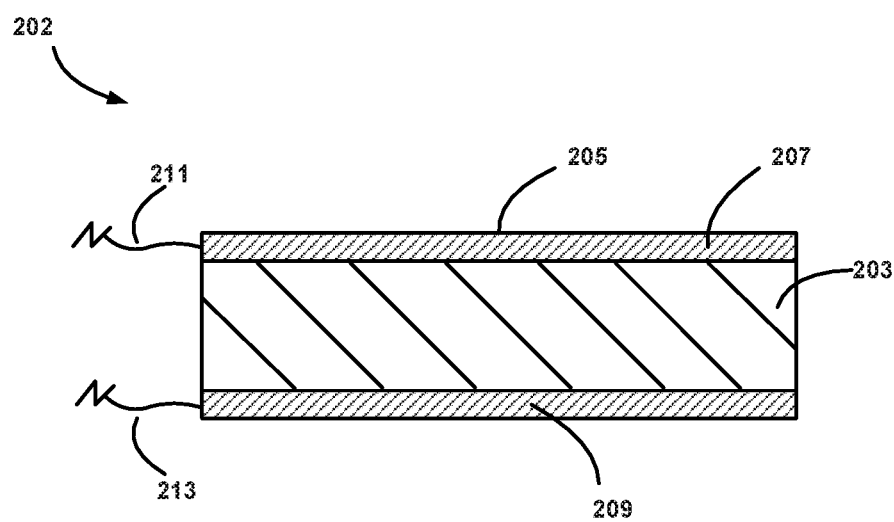
FIG. 2 illustrates a sensor, in accordance with various embodiments.

Referring now to FIG. 2, a sensor 202 (or a pressure sensing component), such as, for example, the sensor 102 described above with reference to FIGS. 1A, 1B, and 1C is illustrated. Similar to the above description, the sensor 202 includes a foam layer 203 that itself comprises one or more of a piezoelectric foam, a triboelectric foam or a tribo-piezoelectric foam. In various embodiments, the sensor 202 includes an electrode 205 in electrical communication with the foam layer 203. In various embodiments, the sensor 202 may include a first electrode 207 and a second electrode 209 that sandwich the foam layer 203, with the first electrode 207 connected to a processor (e.g., the processor 104 described with reference to FIGS. 1A, 1B and 1C) via a first conductor 211 and the second electrode 209 connected to the processor via a second conductor 213.

In various embodiments, the foam layer 203 is constructed using a material exhibiting piezoelectric properties. The foam layer 203 may, for example, include a foam material embedded with activated piezoelectric particles, which generate an electric voltage through the piezoelectric effect when a pressure or force is applied to the sensor containing the foam layer 203. In various embodiments, such piezoelectric sensors are constructed using a foam material and additives having piezoelectric particles dispersed therein. A high voltage activation process (or a poling process) aligns the piezoelectric particles within the foam layer 203. The first electrode 207 and the second electrode 209 are adhered to the foam layer 203 using an adhesive. When a force is applied to the foam layer 203, a piezoelectric signal is generated within the bulk of the foam layer 203 in proportion to the force, and the piezoelectric signal (e.g., a charge or a voltage difference) is detected via the processor attached to the foam layer 203 via the first electrode 207 and the second electrode 209. The level of the piezoelectric signal (e.g., a magnitude of the voltage difference) is affected by various factors, including, for example, the magnitude of the force, the type and quantity of the piezoelectric additive, the thickness of the foam layer 203 and the compressibility of the foam layer 203.

Examples of foam materials having properties suitable for construction of the sensor 202, for either the piezoelectric-based implementation or the triboelectric implementation, include polyurethane foams, polyethylene foams, latex rubber foams, silicone based foams and aerogels and or like; and high density foams, closed cell foams, dry fast open cell foams, convoluted foams, and high resilience foams or the like. Although exemplary foam materials or properties are identified above, it is contemplated that any foam material suitable for the sensor 202 or the applications disclosed herein may be employed. In various embodiments, the foregoing foam materials may provide a porous polymer matrix suitable to add a piezoelectric additive comprising a plurality of piezoelectric particles (e.g., a plurality of piezoelectric microparticles or a plurality of piezoelectric nanoparticles) to form a piezoelectric foam (e.g., a porous nanoparticle-polymer composite structure or a porous nanoparticle-polymer composite structure). In various embodiments, the polymer matrix or the porous polymer matrix (which may comprise a foam substrate comprising a polymeric material that is cured from a curable liquid polymer) may be fabricated by forming pores in any of the foregoing materials. In various embodiments, the piezoelectric foam may comprise an electrical insulator.

Examples of piezoelectric materials contemplated for use as additives to the foam materials for the piezoelectric implementations include various classes of materials. A first class of materials, synthetic ceramics, include barium titanate (BaTiO$_3$) (or BTO), lead zirconate titanate (Pb[Zr$_x$Ti$_{1-x}$]O$_3$ with 0≤x≤1) (or PZT), potassium niobate (KNbO$_3$), sodium tungstate (Na$_2$WO$_3$), Ba$_2$NaNb$_5$O$_{15}$ and Pb$_2$KNb$_5$O$_{15}$. A second class, naturally occurring crystals, includes quartz, berlinite (AlPO$_4$), sucrose (e.g., table sugar), Rochelle salt (e.g., potassium sodium tartrate), topaz (Al$_2$SiO$_4$(F, OH)$_2$), tourmaline-group minerals and lead titanate (PbTiO$_3$). A third class, synthetic crystals, includes langasite (La$_3$Ga$_5$SiO$_{14}$), gallium orthophosphate (GaPO$_4$), lithium niobate (LiNbO$_3$) and lithium tantalate (LiTaO$_3$). A fourth class, lead-free piezoceramics, includes, sodium potassium niobate ((K,Na)NbO$_3$), bismuth ferrite (BiFeO$_3$), sodium niobate NaNbO$_3$) barium titanate (BaTiO$_3$), bismuth titanate (Bi$_4$Ti$_3$O$_{12}$) and sodium bismuth titanate (NaBi(TiO$_3$)$_2$). Other classes include III-V and II-VI semiconductors, where strong piezoelectricity is observed in wurtzite structures, e.g., GaN, InN, AlN and ZnO, and polymers, such as, for example, polyvinylidene fluoride (PVDF). In various embodiments, the piezoelectric materials comprise a piezo-crystal lattice structure, a tetragonal crystal lattice structure or a piezoelectrical structure and a size in a range of, for example, 100 nanometers to 100 micrometers. In various embodiments, the piezoelectric particles comprise piezoelectric microparticles or piezoelectric nanoparticles, such as, for example, barium titanate microparticles or barium titanate nanoparticles, respectively.

Similar to the foregoing, in various embodiments, the foam layer 203 may be constructed using materials dominated by triboelectric properties. In such embodiments, there is no piezoelectric additive combined with the foam. Further, in such embodiments, the materials that comprise the foam layer 203 need not undergo a poling process for aligning piezoelectric particles within the foam layer 203. A triboelectric signal is generated at an interface between an electrode and a surface of the foam layer 203. For example, the triboelectric signal may be generated by a relative motion occurring between the first electrode 207 and the foam layer 203 or between the second electrode 209 and the foam layer 203. The level of the triboelectric signal is affected by the relative difference in the triboelectric coefficients of the foam layer 203 and the first electrode 207 and the second electrode 209. The triboelectric signal may also be affected by the adhesive used to bond the electrodes to the foam layer 203. As noted in more detail below, where piezoelectric particles are combined into and poled within the foam layer 203, both piezoelectric and triboelectric signals may be combined in the output signal of a sensor containing the foam layer 203.

In fabricating the sensor 202 having piezoelectric properties, a foam material and a piezoelectric additive are selected, mixed, molded into a desired shape and then allowed to cure. During the mixing process, care should generally be taken to ensure the particles or the piezoelectric additive are well mixed within the foam, and that the particles do not simply collect at the bottom of the foam mix. In various embodiments, a process of sonication (e.g., application of sound energy to agitate the particles within the foam) may assist in distributing the piezoelectric particles within the foam. In various embodiments, a mold used for the molding and subsequent curing process is a vent mold (e.g., a mold having an opening to the surrounding environment), which permits volumetric expansion during the curing process. In various embodiments, the mold may be partially closed or fully close to the surrounding environment in order to restrict the expansion of the foam material, embedded with the piezoelectric particles, to a specific size or shape. Examples of the mixing and curing process are provided below.

Example 1

Particles of BTO (e.g., 200 nanometer particles in a tetragonal phase) are mixed with Part A (e.g., methylene diphenyl diisocyanate) and Part B of a two-part polyurethane system to provide a mixture having a weight percent of BTO equal to sixty percent (60%)—e.g., the weight of the BTO particles divided by the total weight of the BTO/foam mixture when complete (BTO+Part A+Part B) equals 60%. The mixture of BTO particles and Part A and the mixture of BTO particles and Part B are each sonicated for twelve minutes (12 min) and then combined and stirred for thirty seconds (30 sec). The combined mixture is then poured into a mold and cured for forty-five to sixty minutes (45-60 min) at room temperature. A release agent or fabric sheet coated with PDVF may be applied to the mold prior to curing. Once cured, the resulting foam layer is removed from the mold for further processing (e.g., poling). The two-part polyurethane system may be obtained from Smooth-On, Inc. under the trade name FlexFoam-iT!™14. As indicated in the table below, this example preparation was also performed using two-part polyurethane systems sold under the tradenames FlexFoam-iT!™ 17 and 23.

Example 2

Part A (e.g., methylene diphenyl diisocyanate) and Part B (polyol) of a two-part polyurethane system are mixed with particles of BTO to provide a mixture having a weight percent of BTO equal to sixty percent (60%)—e.g., the weight of the BTO particles divided by the total weight of the mixture when complete (BTO+Part A+Part B) equals 60%. The mixing may be accomplished, for example, using a mixer sold under the tradename SpeedMixer™, by Flack-Tek, Inc., of Landrum, South Carolina. Specifically, particles of BTO (e.g., 200 nanometer particles in a tetragonal phase) are added to Part B and mixed for thirty seconds (30 sec) at eight hundred rotations per minute (800 rpm), followed by sixty seconds (60 sec) at two thousand rotations per minute (2,000 rpm). Similarly, the same particles of BTO are added to Part A and mixed for thirty seconds (30 sec) at eight hundred rotations per minute (800 rpm). Parts A and B, with the BTO particles mixed therein, are then mixed together for forty seconds (40 sec) at two thousand rotations per minute (2,000 rpm). The combined mixture is then poured into a mold and cured for forty-five to sixty minutes (45-60 min) at room temperature. A release agent or fabric sheet coated with PDVF may be applied to the mold prior to curing. Once cured, the resulting layer is removed from the mold for further processing (e.g., poling). The two-part polyurethane system may be obtained from Smooth-On, Inc. under the trade name URE-BOND™ II.

In various embodiments, while keeping the ratio of piezoelectric additives within the foam unchanged, techniques to soften the piezoelectric foams and increase the foam strain under similar pressures or forces are applied. With such techniques, the piezoelectric foams are able to produce higher voltages and the foam electrical sensitivity versus force is enhanced. Such techniques include, for example, adding water to the pristine formulation or adding foaming gases (e.g., carbon dioxide). Adding a small percentage of water to the polyurethane and BTO mixture described above in Example 2, for example, has the combined effect of reducing the density of the foam and increasing the voltage produced for the same applied force. In various embodiments, for example, the water is added to Part B (e.g., polyol) of the two-part polyurethane system described above with reference to Example 2, with the percent water being added measured as a weight percent of the water with reference to the weight of the Part B component (see below table). The result is a foam that is softer and more electrically sensitive (e.g., the foam generates a greater electrical signal for a given applied force) than the same mixture not containing water. The following table illustrates the signal improvement as a function of percentage water added for a specific BTO dopant level (60%). Here, the indicated signal is the voltage output of the sensor normalized by the applied force (in Newtons). The percentage signal increase (SI) may thus be defined by the following relation:

$$SI(\%) = (V_{PS}/V_{NOM} - 1) * 100$$

where $V_{PS}$ is the signal produced by the piezoelectric sensor and $V_{NOM}$ (equal to 1.92 V/N) is a nominal signal produced by a similar composite structure or the piezoelectric sensor with no water added.

| Percentage Water Added | $V_{PS}$ (V/N) | Signal Increase |
|---|---|---|
| 0.00% | 1.92 | 0% |
| 0.10% | 2.17 | 13% |
| 0.25% | 2.25 | 17% |
| 0.50% | 2.50 | 30% |
| 0.90% | 3.50 | 82% |

Example 3

A mixture of ethylene-vinyl-acetate, polyolefin elastomer, and styrene-butadiene-styrene is prepared to form an EVA mixture. Particles of BTO are added to the EVA mixture to provide a mixture having a weight percent of BTO equal to thirty percent (30%)—e.g., the weight of the BTO particles divided by the total weight of the BTO/EVA mixture when complete (BTO+EVA mixture) equals 30%. The BTO/EVA mixture is kneaded and then foamed in a mold using a hot compression foaming process. Once complete, the resulting foam sheet is removed from the mold for further processing (e.g., poling).

In the foregoing examples, the amount of BTO may be selected from 0-90% dopant levels by weight with respect to the foam material. In various embodiments, however, it has been found in cases where the foam material comprises polyurethane foams, the output signal of the sensor includes contributions from both piezoelectric and triboelectric effects. In various embodiments, for example, where the dopant level is above a threshold percentage level, the contribution to the output signal is generally dominated by the piezoelectric signals. For values less than the threshold percentage level, the output signal comprises a combination of piezoelectric and triboelectric signals. Preloading the sensor may, in various embodiments, at least partially suppress the effects due to the triboelectric signal at dopant concentrations less than the threshold percentage level. In various embodiments, and without limitation, the threshold percentage level is about 60% by weight of the dopant.

Referring to the following table, various examples of foams and piezoelectric additives fabricated and tested are summarized, together with observed test results, but the disclosure contemplates a range of combinations of foam materials and piezoelectric additives and is not limited to these examples.

| Base Foams | Piezoelectric Additive | Mix/Cure time | Sensor Size (Tested) | Test Results Comments |
|---|---|---|---|---|
| FlexFoam 14 | BTO: 0-90% by wt | Cure time: 45 mins | 30 mm diameter; 2 mm, 3 mm, 5 mm thickness | Asker C Hardness: 40-80 |
| FlexFoam 17 | BTO: 0-90% by wt | Cure time: 45 mins | 30 mm diameter; 2 mm, 3 mm, 5 mm thickness | |
| FlexFoam 23 | BTO: 0-90% by wt | Cure time: 45 mins | 30 mm diameter; 2 mm, 3 mm, 5 mm thickness | Generally more rigid foam when cured. Hardness > 65 |
| EVA | BTO: 10% by wt BTO: 15% by wt BTO: 30% by wt | Hot Compression molding | 30 mm diameter; 0.5 mm, 1 mm, 2 mm thickness | Generally soft foam - typically Hardness 30-70 |

In various embodiments, the piezoelectric additive or filler may comprise a majority of a total weight (or a combined weight) of the piezoelectric foam (e.g., the foam layer 203), or a piezoelectric foam precursor or mixture. For example, in various embodiments, the weight percent of the piezoelectric additive (or filler weight) may comprise about 51% or greater of the total weight of the piezoelectric foam, or from about 51% to about 65% of the total weight of the piezoelectric foam. In various embodiments, the additive range may be from about 10% to about 65% of the total weight of the piezoelectric foam, or a piezoelectric foam precursor or mixture; for example, from about 20% to about 51%, or from about 30% to about 45% of the total weight. In various embodiments, the piezoelectric additive may be greater than about 65% of the total weight, about 65% or less of the total weight, about 50% or less of the total weight, about 30% or less of the total weight, or about 20% or less of the total weight. Further, in various embodiments, the piezoelectric foam (e.g., the foam layer 203) may have a piezoelectric coefficient greater than about 1 (picoCoulombs/Newton); and in various embodiments, the piezoelectric coefficient is equal to about 100 pC/N or less, about 50 pC/N or less, about 20 pC/N or less, or about 10 pC/N or less.

In fabricating the sensor 202 having triboelectric properties, a foam material is selected, mixed, molded into a desired shape and then allowed to cure. Similar to the foregoing discussion, in various embodiments, a mold used for the molding and subsequent curing process is an open mold (e.g., a mold open to the surrounding environment), which permits volumetric expansion during the curing process. In various embodiments, the mold may be partially closed or fully close to the surrounding environment in order to restrict the expansion of the foam material to a specific size or shape. Examples of the mixing and curing process are provided below.

Example 4

Particles of BTO are mixed with Part A (e.g., methylene diphenyl diisocyanate) of a two-part polyurethane system to provide a mixture having a weight percent of BTO equal to 10%—e.g., the weight of the BTO particles divided by the total weight of the BTO/foam mixture when complete (BTO+Part A+Part B) equals 10%. The mixture of BTO particles and Part A is sonicated for 12 minutes and then added to Part B and stirred for 30 seconds. The mixture is then poured into a mold and cured for 45-60 minutes at room temperature. A release agent or fabric sheet coated with PDVF may be applied to the mold prior to curing. Once cured, the resulting foam layer is removed from the mold; no poling is applied. The two-part polyurethane system may be obtained from Smooth-On, Inc. under the trade name FlexFoam-iT!™ 14. As indicated in the table below, this example preparation was also performed using two-part polyurethane systems sold under the tradenames FlexFoam-iT!™ 17 and 23.

Example 5

A mixture of ethylene-vinyl-acetate, polyolefin elastomer, and styrene-butadiene-styrene is prepared to form an EVA mixture. Particles of BTO are added to the EVA mixture to provide a mixture having a weight percent of BTO equal to ten percent (10%)—e.g., the weight of the BTO particles divided by the total weight of the BTO/EVA mixture when complete (BTO+EVA mixture) equals 10%. The BTO/EVA mixture is kneaded and then foamed using a hot compression foaming process. Once foamed, the resulting foam layer is removed from the mold; no poling is applied.

Figure 3A:
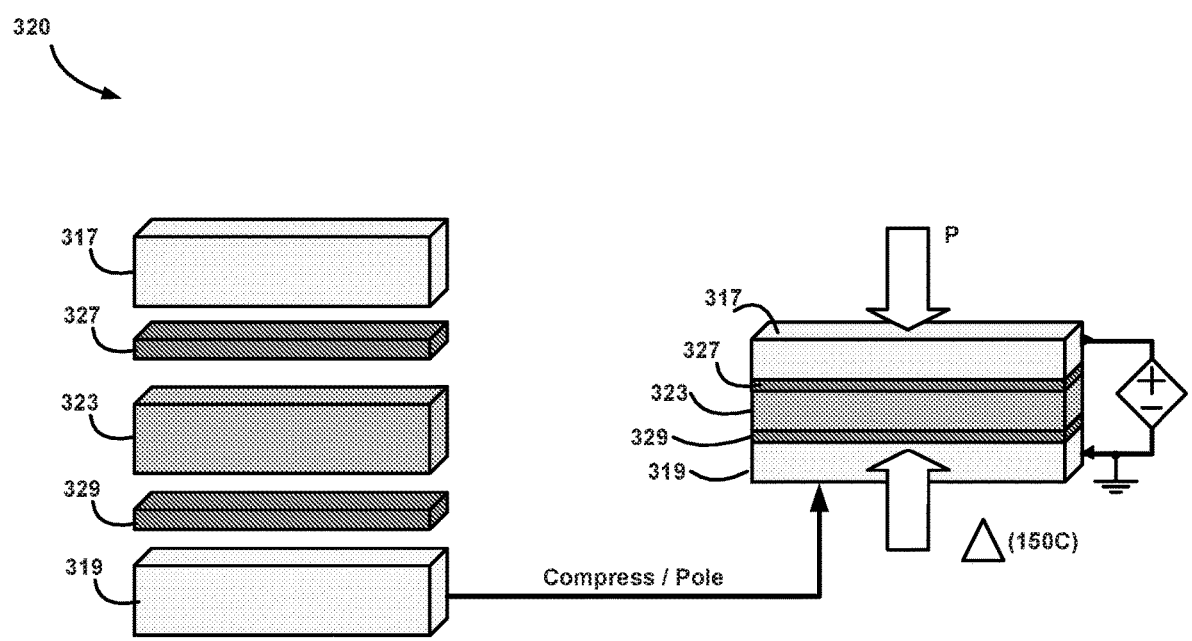
FIGS. 3A and 3B illustrate a poling process, in accordance with various embodiments.
Figure 3B:
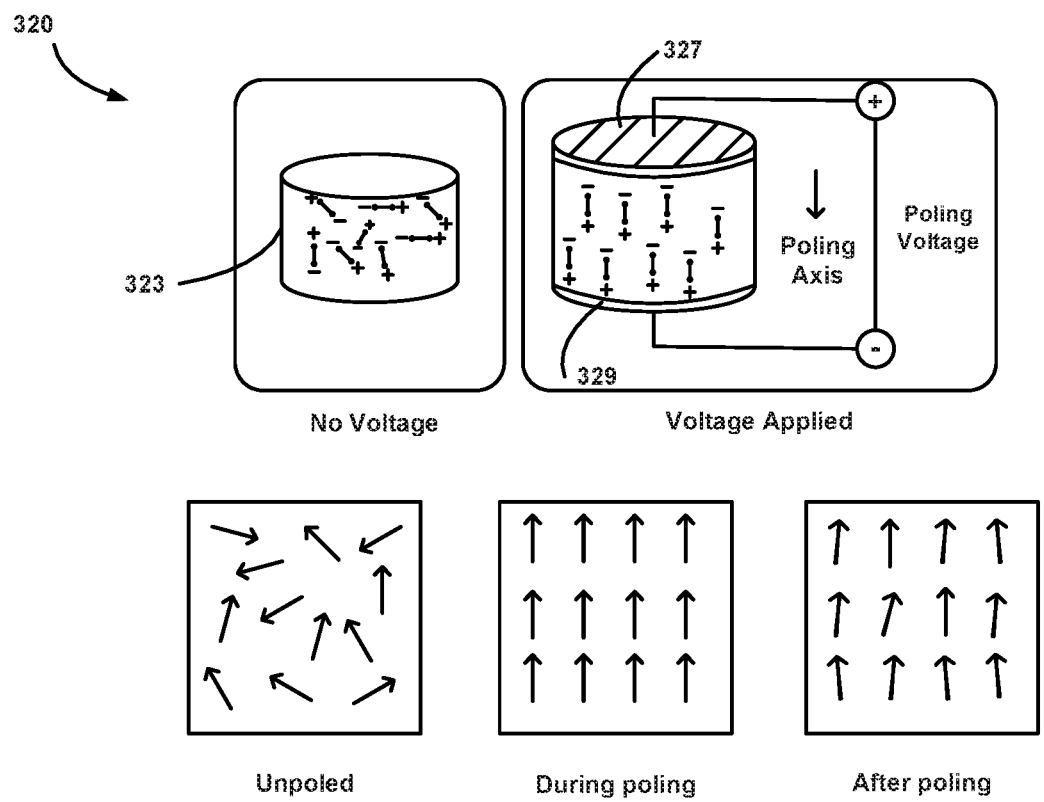

Referring now to FIGS. 3A and 3B, a poling system 320 used to align piezoelectric particles within a base foam 323 to produce a foam layer, such as, for example, the foam layer 203 described above with reference to FIG. 2, is illustrated. Typically, the base foam 323 is only weakly piezoelectric or shows no piezoelectric properties, since the dipoles in the piezoelectric particles are randomly oriented, as illustrated in the un-poled state in FIG. 3B. Following poling, the piezoelectric particles BTO nanoparticles) remain oriented in an aligned state, as also illustrated in FIG. 3B. To activate the particles within the piezoelectric additive, the base foam 323 is poled in an electric field having a strength sufficient to orient the piezoelectric particles. In various embodiments, this may be achieved by depositing gold (Au) and titanium (Ti) (e.g., 10 nm Ti, followed by 200 nm of Au) on a flexible Kapton substrate to form a pair of electrodes (e.g., a first electrode 327 and a second electrode 329), interfacing the electrodes with the top and bottom surfaces of the base foam 323, and then poling the base foam 323 on a hotplate for a time sufficient to ensure a fully polarized foam. For large foam sheet poling (e.g., for a manufacturing setting), the poling electrodes may comprise aluminum plates with copper mesh sheets that are placed between a surface of the aluminum plates and the surface of the base foam 323. In various embodiments, the electric field strength is above its coercive field but below its dielectric breakdown field, the temperature of the poling is, just below the Currie temperature and the poling time is about 20 minutes to about 90 minutes. The electrodes sandwiching the base foam 323 may likewise be sandwiched by a first plastic substrate 317 and a second plastic substrate 319, to which a load or a pressure P may be applied during the poling process. In various embodiments, the piezoelectric coefficient (e.g., in the $d_{33}$ orientation) of the foam after poling may be quantified using a piezoelectric test apparatus that displays a voltage output of the material simultaneously with the applied load. Prior to testing, the instrument may be calibrated using a commercial PZT film with a piezoelectric coefficient of 300 pC/N. FIGS. 3A and 3B illustrate an exemplary schematic of the poling process.

As illustrated in FIG. 3B, the piezoelectric particles embedded in the base foam 323 are distributed throughout to produce a homogeneous composite and the dipole moments do not align prior to the poling process. Once the electric field is applied, the dipoles within the base foam 323 are aligned. The poling process "activates" the piezoelectric effect in the base foam 323, and aligns the pressure sensitivity in a defined direction to produce a foam layer, such as, for example, the foam layer 203 described above with reference to FIG. 2. In this case, a mechanical force applied to the activated foam in the vertical direction would produce a large combined piezoelectric signal. A mechanical force applied in the horizontal direction (e.g., in a direction perpendicular to the alignment direction of the piezoelectric particles) would produce no significant piezoelectric signal. The optimum poling conditions can vary for each foam additive. Examples of the poling process follow:

Example 6

A foam layer is fabricated using any of the methods described in Examples 1, 2 or 3 using a piezoelectric additive comprising BTO with particle sizes in a range of 200-500 nm (e.g., BTO nanoparticles). The foam layer is subjected to an electric field having a strength between 2-10 kV/mm and a poling temperature (determined by the Curie Temperature) of about 110° C. for 1.5 hours.

Example 7

A foam layer is fabricated using any of the methods described in Examples 1, 2 or 3 using a piezoelectric additive comprising PZT with particle sizes in a range of 5-10 μm (e.g., PZT microparticles). The foam layer is subjected to an electric field having a strength between 2-10 kV/mm and a poling temperature (determined by the Curie Temperature) of about 130° C. for 3 hours.

Other representative poling conditions may include, but are not limited to, an electric field of greater than 10 kV/mm, less than or equal to 10 kV/mm, less than or equal to 5 kV/mm, or less than or equal to 2 kV/mm. In addition, the poling time may be about 15 hours or less, about 10 hours or less, about 5 hours or less, about 3 hours or less or about 1 hour or less. Still further, the poling temperature may be about 150° C. or less, about 130° C. or less, or about 120° C. or less. In various embodiments, different foams may respond to the exposure of high temperatures during the poling process in different manners. For example, foams comprising EVA may significantly shrink as a result of heating to greater than 100° C. By contrast, foams comprising PU-14, PU-17 or PU-23 exhibit limited shrinkage. The hardness and density of the foam may also change as a result of the poling process. For example, foams comprising PU-14, with 60% BTO additives, exhibit an Asker C surface hardness equal to about 40 prior to poling and between about 50 and about 60 after poling.

Figure 4:
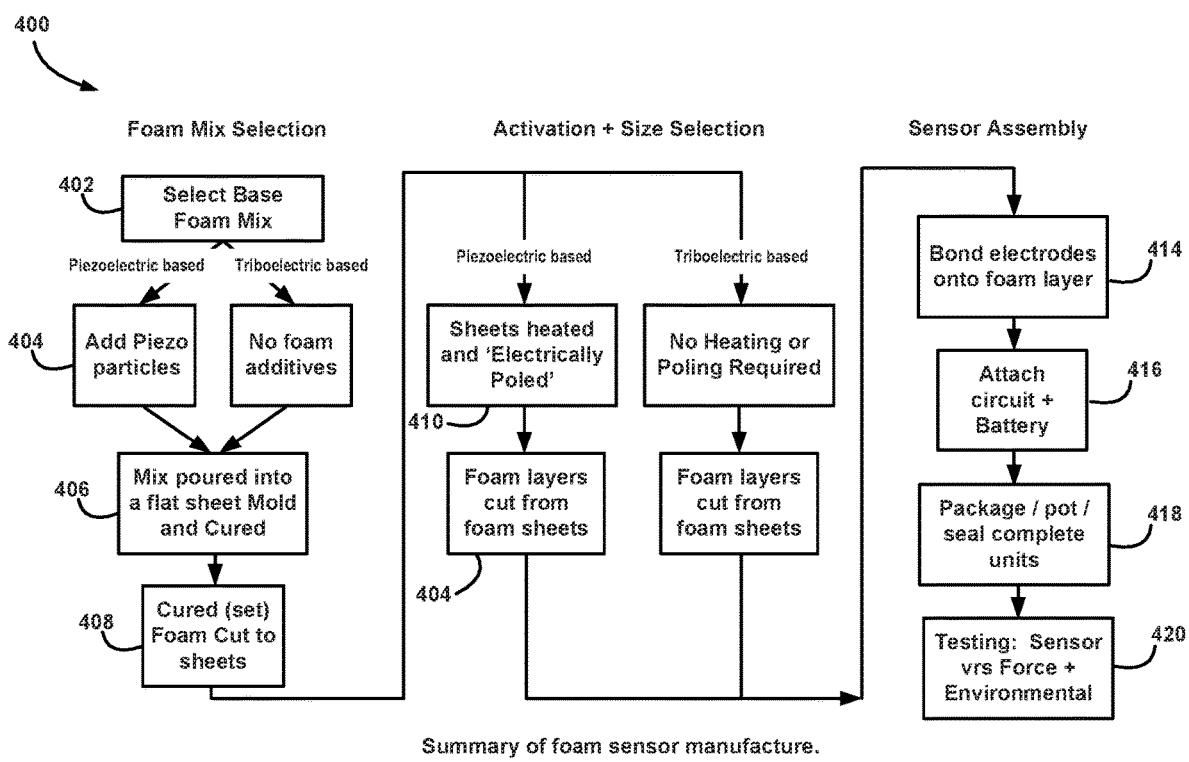
FIG. 4 illustrates a method of fabricating a sensor, in accordance with various embodiments.

Referring now to FIG. 4, a flowchart identifying a method 400 used to fabricate a sensor, such as, for example, the sensor 102 described above with reference to FIGS. 1A-1C or the sensor 202 described above with reference to FIG. 2, is illustrated. In various embodiments, a first step 402 includes selection of a base foam material for use in constructing the sensor. The base foam material may comprise a variety of foams, including, for example, the various foams identified above for fabricating either piezoelectric or triboelectric sensors. In a second step 404, and for piezoelectric sensors, a piezoelectric additive comprising piezoelectric particles is mixed with the base foam material. For triboelectric sensors, no piezoelectric additive is mixed with the base foam material. In a third step 406, the base foam material, including the piezoelectric additive, if used, is poured or otherwise placed into a mold and cured. In a fourth step 408, the cured base foam material is cut into foam sheets. In a fifth step 410, and for piezoelectric sensors, the foam sheets are subjected to a poling process which, in various embodiments, includes subjecting the foam sheets to heat and pressure while in an electric field as described above. For triboelectric sensors, the foam sheets are not subjected to the poling process. In a sixth step 412, a foam layer (or a plurality of foam layers), similar to the foam layer 103 described above with reference to FIGS. 1A-1C or the foam layer 203 described above with reference to FIG. 2 is cut from the foam sheets. In a seventh step 414, one or more electrodes are bonded to the foam layer to form the sensor. In an eighth step 416, the sensor may be attached to or combined with a circuit and a power source. In a ninth step 418, the sensor combined with a circuit and power source is packaged and sealed to provide a sensor unit. In a tenth step 420, the sensor unit may be tested to ensure the signal generated by a force applied to the sensor unit is accurate. Note that where the sensor is intended for use in dry, low humidity conditions, there is a risk of static charge build up in the foam material comprising the sensor. In various embodiments, then, the sensor may be covered by an antistatic material configured to reduce static (the equivalent of putting the sensor in a Faraday cage) and to further seal the sensor for use in such conditions or other extreme environments. As will be appreciated, various of the above steps may be eliminated or interchanged without departing from the spirit of the disclosure. For example, a triboelectric sensor may include piezoelectric particles that are not activated via a poling process.

Figure 5A:
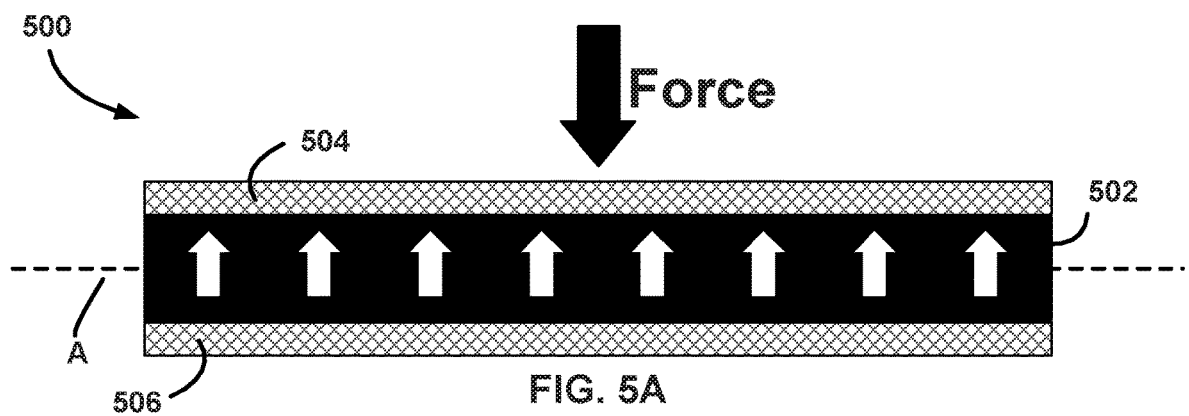
FIGS. 5A, 5B, 5C, 5D, 5E, 5F, and 5G illustrate sensor configurations, in accordance with various embodiments.

Referring now to FIGS. 5A-5G, schematic views of several piezoelectric-based sensors are provided, in accordance with various embodiments. For example, FIG. 5A illustrates a sensor 500 that includes a foam layer 502 having a poling direction that is perpendicular to a longitudinal axis A extending along the foam layer 502. The foam layer 502 includes a piezoelectric additive and has been fabricated and poled using a method similar to the method 400 described above with reference to FIG. 4. As illustrated, the sensor 500 includes a first electrode 504 and a second electrode 506 that run parallel to the longitudinal axis A and perpendicular to the poling direction. In various embodiments, the sensor 500 is configured to detect a force that is applied in a direction parallel to the poling direction or perpendicular to the longitudinal axis A.

Figure 5B:
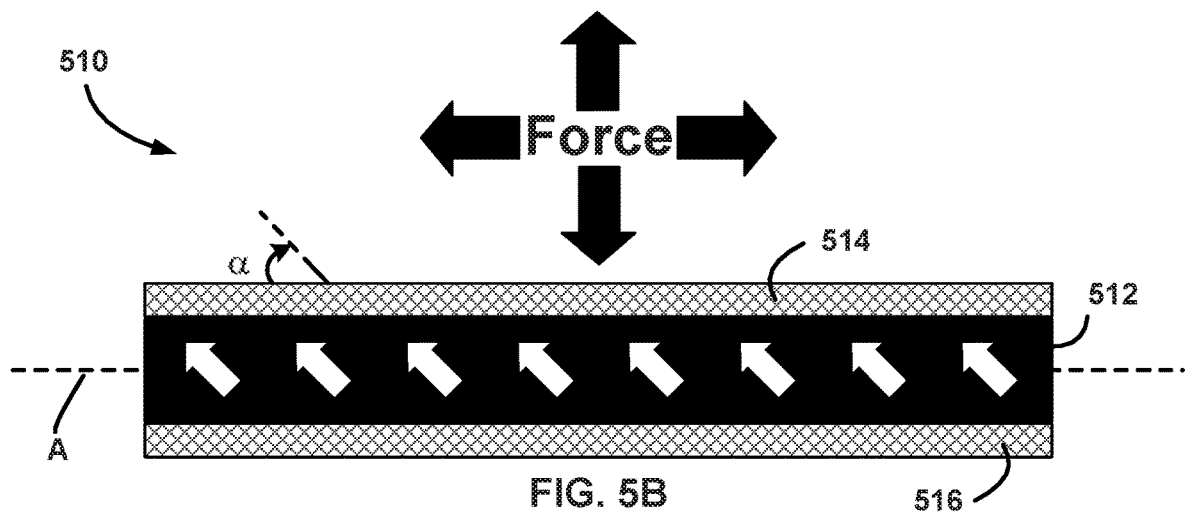

Referring to FIG. 5B, a sensor 510 includes a foam layer 512 having a poling direction that lies at an angle, a, with respect to a longitudinal axis A extending along the foam layer 512, such that $0°<\alpha<90°$ (or $0<\alpha<1.57$ rad). In various embodiments, for example, the angle α equals about 45° (0.785 rad), as illustrated in FIG. 5B. The foam layer 512 includes a piezoelectric additive and has been fabricated and poled using a method similar to the method 400 described above with reference to FIG. 4. After fabricating the foam sheet according to the method described above, the foam layer 512 is cut from the foam sheet in a manner that provides the desired angle α. As illustrated, the sensor 510 includes a first electrode 514 and a second electrode 516 that run parallel to the longitudinal axis A. In various embodiments, the sensor 510 is configured to detect a force that includes components that are both parallel and perpendicular with respect to the longitudinal axis A. In other words, the sensor 510 is configured to detect forces having both normal and shear components.

Figure 5C:
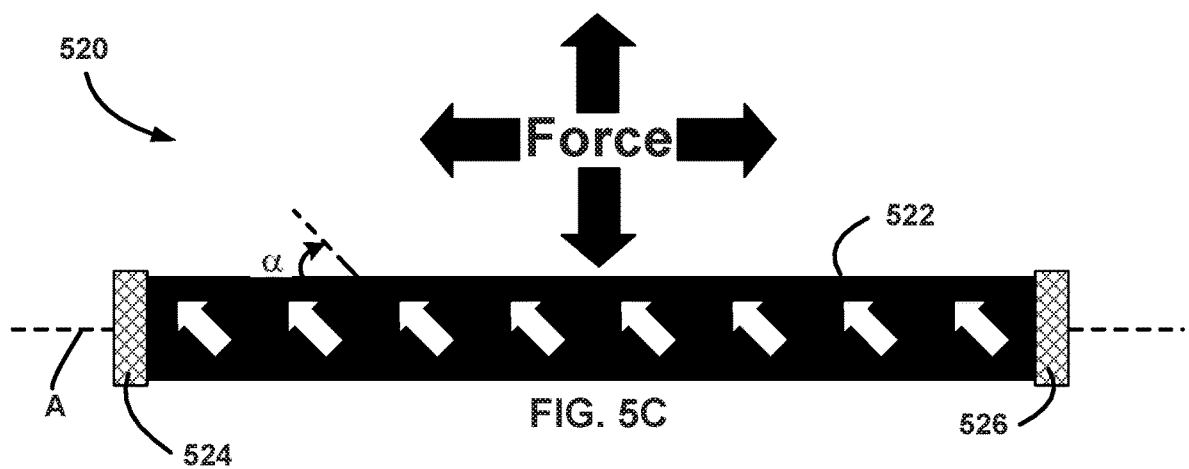

Referring to FIG. 5C, a sensor 520 includes a foam layer 522 having a poling direction that lies at an angle, a, with respect to a longitudinal axis A extending along the foam layer 522, such that $0°<\alpha<90°$ (or $0<\alpha<1.57$ rad). In various embodiments, for example, the angle α equals about 45° (0.785 rad), as illustrated in FIG. 5C. The foam layer 522 includes a piezoelectric additive and has been fabricated and poled using a method similar to the method 400 described above with reference to FIG. 4. After fabricating the foam sheet according to the method described above, the foam layer 522 is cut from the foam sheet in a manner that provides the desired angle α. As illustrated, the sensor 520 includes a first electrode 524 and a second electrode 526 that run perpendicular to the longitudinal axis A. In various embodiments, the sensor 520 is configured to detect a force that includes components that are both parallel and perpendicular with respect to the longitudinal axis A. In other words, the sensor 520 is configured to detect forces having both normal and shear components. In various embodiments, the sensor 520 is identical to the sensor 510 described above with reference to FIG. 5B, with the exception that the electrodes are positioned at the sides of the sensor, rather than at the upper and lower surfaces of the sensor.

Figure 5D:
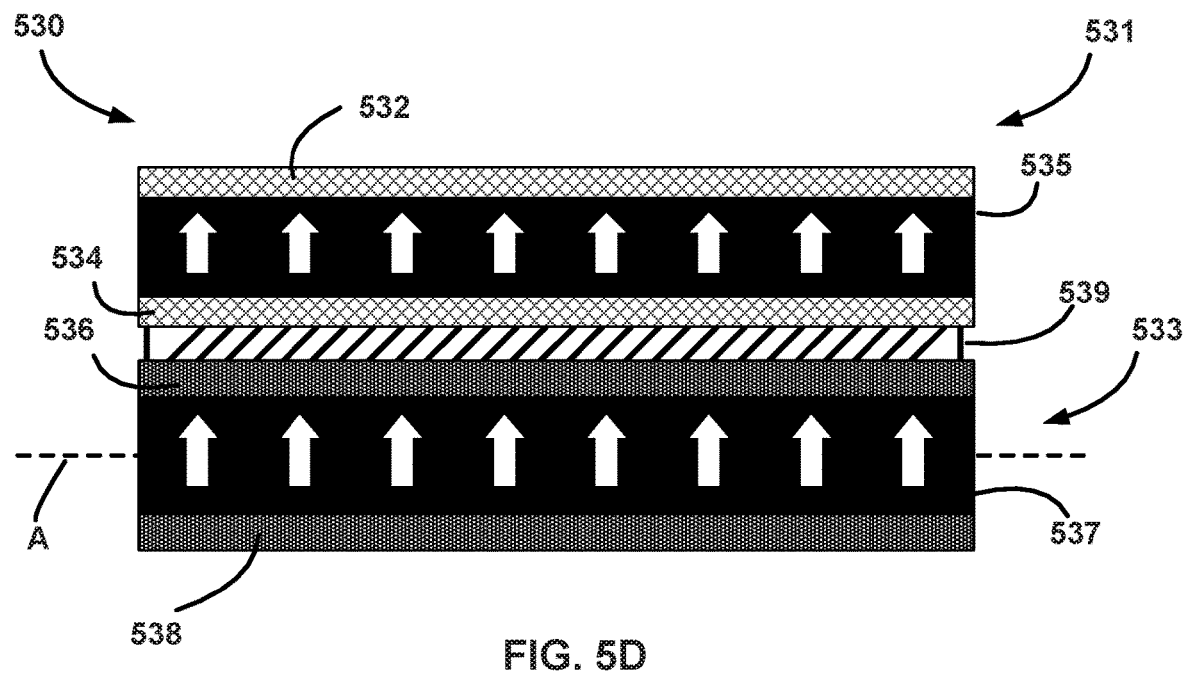

Referring now to FIG. 5D, a sensor 530 is illustrated having a stacked configuration. In various embodiments, the sensor 530 includes a first sensor 531 disposed adjacent (or stacked upon) a second sensor 533 to form the stacked configuration. In various embodiments, the first sensor 531 includes a first foam layer 535 that exhibits a first compressibility, while the second sensor 533 includes a second foam layer 537 that exhibits a second compressibility, where the first compressibility may be greater than, less than or equal to the second compressibility, thereby allowing for measurement of different dynamic ranges of sensing. In various embodiments, both the first foam layer 535 and the second foam layer 537 include a piezoelectric additive and have been fabricated and poled using a method similar to the method 400 described above with reference to FIG. 4. As illustrated, and similar to the sensor 500 and the foam layer 502 described above with reference to FIG. 5A, both the first sensor 531 and the second sensor 533 exhibit a poling direction within the first foam layer 535 and the second foam layer 537, respectively, that is perpendicular to a longitudinal axis A extending along the second foam layer 537. As illustrated, the first sensor 531 includes a first electrode 532 and a second electrode 534 and the second sensor 533 includes a first electrode 536 and a second electrode 538, each of which runs parallel to the longitudinal axis A and perpendicular to the poling direction. In various embodiments, the sensor 530 is configured to detect a force that is applied in a direction parallel to the poling direction or perpendicular to the longitudinal axis A. In various embodiments, an insulating layer 539 is disposed between the first sensor 531 and the second sensor 533 and configured to insulate the second electrode 534 of the first sensor 531 from the first electrode 536 of the second sensor 533. In various embodiments, a first thickness of the first foam layer 535 and a second thickness of the second foam layer 537 may be selected to enhance the dynamic range sensitivity of the sensor 530 provided through the use of the first compressibility and the second compressibility having different values. For example, in various embodiments, the first thickness of the first foam layer 535 may be less than the second thickness of the second foam layer 537, while the first foam layer 535 exhibits a soft or relatively high compressibility and the second foam layer 537 exhibits a stiff or relatively low compressibility.

Figure 5E:
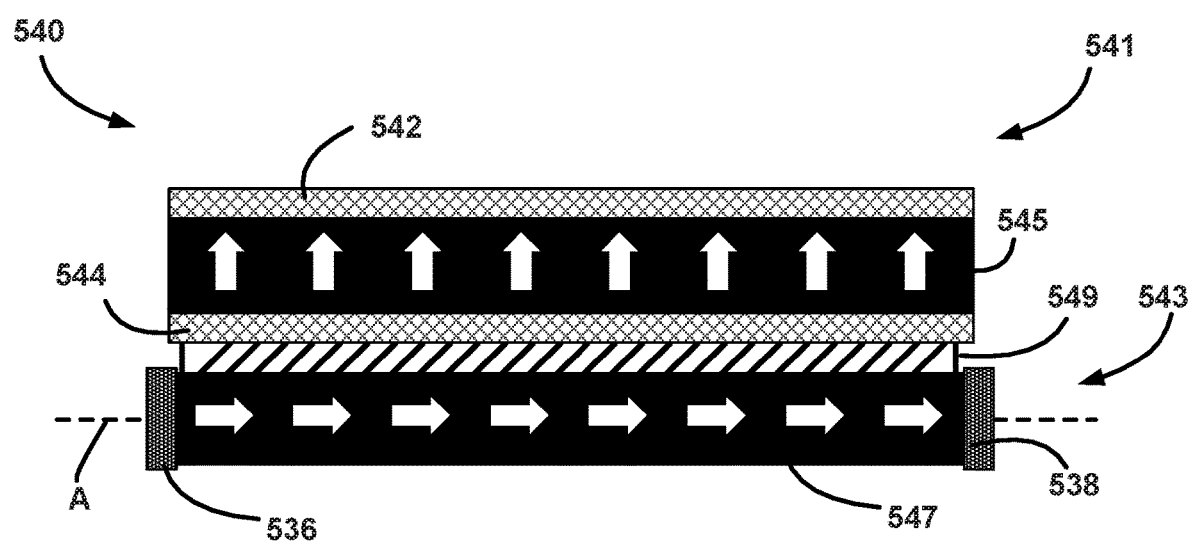

Referring now to FIG. 5E, a sensor 540 is illustrated having a stacked configuration. In various embodiments, the sensor 540 includes a first sensor 541 disposed adjacent (or stacked upon) a second sensor 543 to form the stacked configuration. In various embodiments, the first sensor 541 includes a first foam layer 545 that exhibits a first compressibility, while the second sensor 543 includes a second foam layer 547 that exhibits a second compressibility, where the first compressibility may be greater than, less than or equal to the second compressibility, thereby allowing for measurement of different dynamic ranges of sensing. In various embodiments, both the first foam layer 545 and the second foam layer 547 include a piezoelectric additive and have been fabricated and poled using a method similar to the method 400 described above with reference to FIG. 4. As illustrated, the first sensor 541 and the second sensor 543 exhibit poling directions within the first foam layer 545 and the second foam layer 547, respectively, that are perpendicular to one another—e.g., the poling direction of the first foam layer 545 is perpendicular to a longitudinal axis A extending along the second foam layer 547, while the poling direction of the second foam layer 547 is parallel to the longitudinal axis A. As illustrated, the first sensor 541 includes a first electrode 542 and a second electrode 544 and the second sensor 543 includes a first electrode 546 and a second electrode 548, each of which runs parallel to the longitudinal axis A. In various embodiments, the sensor 540 is configured to detect a force that includes components that are both parallel and perpendicular with respect to the longitudinal axis A. In other words, the sensor 540 is configured to detect forces having both normal and shear components. In various embodiments, an insulating layer 549 is disposed between the first sensor 541 and the second sensor 543. In various embodiments, a first thickness of the first foam layer 545 and a second thickness of the second foam layer 547 may be selected to enhance the dynamic range sensitivity of the sensor 540 provided through the use of the first compressibility and the second compressibility having different values. For example, in various embodiments, the first thickness of the first foam layer 545 may be less than the second thickness of the second foam layer 547, while the first foam layer 545 exhibits a soft or relatively high compressibility and the second foam layer 547 exhibits a stiff or relatively low compressibility.

Figure 5F:
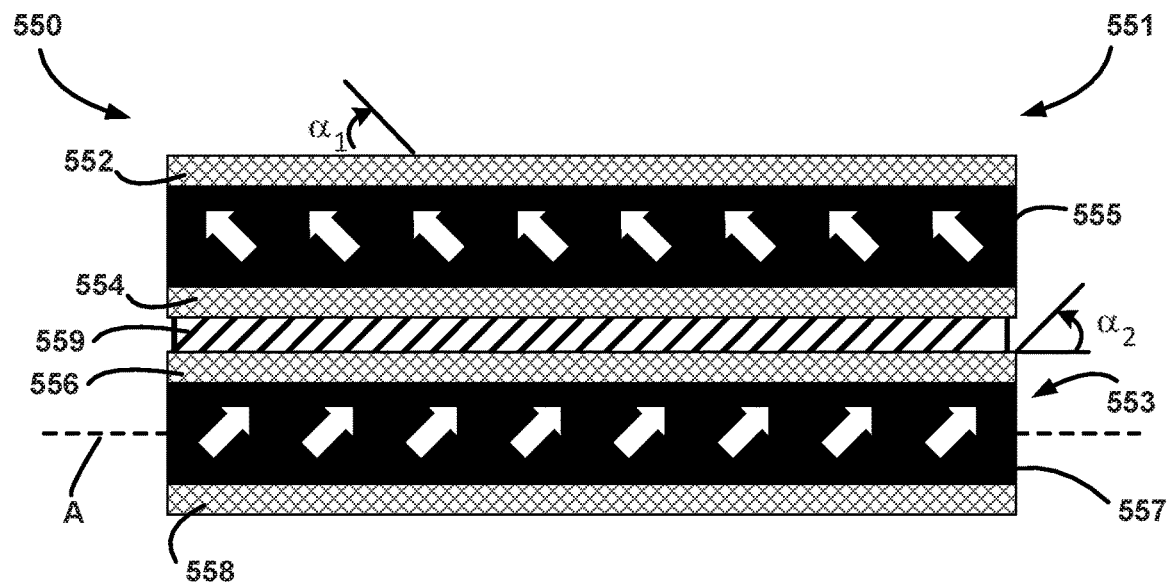

Referring now to FIG. 5F, a sensor 550 is illustrated having a stacked configuration. In various embodiments, the sensor 550 includes a first sensor 551 disposed adjacent (or stacked upon) a second sensor 553 to form the stacked configuration. In various embodiments, the first sensor 551 includes a first foam layer 555 that exhibits a first compressibility, while the second sensor 553 includes a second foam layer 557 that exhibits a second compressibility, where the first compressibility may be greater than, less than or equal to the second compressibility, thereby allowing for measurement of different dynamic ranges of sensing. In various embodiments, both the first foam layer 555 and the second foam layer 557 include a piezoelectric additive and have been fabricated and poled using a method similar to the method 400 described above with reference to FIG. 4. As illustrated, the first sensor 551 and the second sensor 553 exhibit poling directions that lie, respectively, at a first angle, $\alpha_1$, and at a second angle, $\alpha_2$, with respect to a longitudinal axis A extending along the second foam layer 557, such that $0°<\alpha_1, \alpha_2<90°$ (or $0<\alpha_1, \alpha_2<1.57$ rad). In various embodiments, for example, both the first angle $\alpha_1$ and the second angle $\alpha_2$ equal about 45° (0.785 rad), as illustrated in FIG. 5F. As illustrated, the first sensor 551 includes a first electrode 552 and a second electrode 554 and the second sensor 553 includes a first electrode 556 and a second electrode 558, each of which runs parallel to the longitudinal axis A. In various embodiments, the sensor 550 is configured to detect a force that includes components that are both parallel and perpendicular with respect to the longitudinal axis A, similar to the sensor 510 described above with reference to FIG. 5B. In other words, the sensor 550 is configured to detect forces having both normal and shear components. In various embodiments, an insulating layer 559 is disposed between the first sensor 551 and the second sensor 553. In various embodiments, a first thickness of the first foam layer 555 and a second thickness of the second foam layer 557 may be selected to enhance the dynamic range sensitivity of the sensor 550 provided through the use of the first compressibility and the second compressibility having different values. For example, in various embodiments, the first thickness of the first foam layer 555 may be less than the second thickness of the second foam layer 557, while the first foam layer 555 exhibits a soft or relatively high compressibility and the second foam layer 557 exhibits a stiff or relatively low compressibility.

Figure 5G:
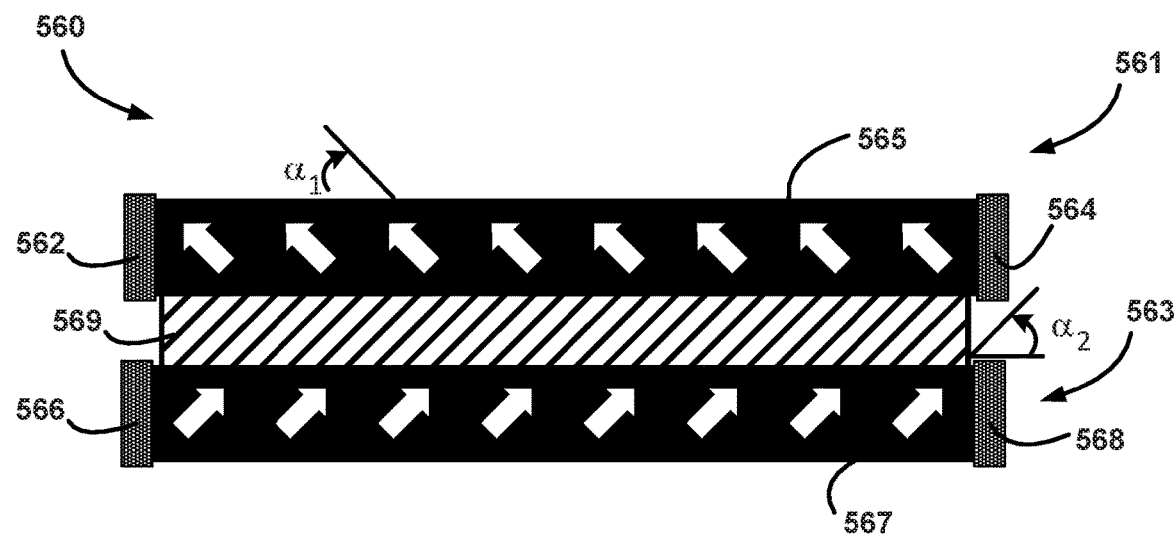

Referring now to FIG. 5G, a sensor 560 is illustrated having a stacked configuration. In various embodiments, the sensor 560 includes a first sensor 561 disposed adjacent (or stacked upon) a second sensor 563 to form the stacked configuration. In various embodiments, the first sensor 561 includes a first foam layer 565 that exhibits a first compressibility, while the second sensor 563 includes a second foam layer 567 that exhibits a second compressibility, where the first compressibility may be greater than, less than or equal to the second compressibility, thereby allowing for measurement of different dynamic ranges of sensing. In various embodiments, both the first foam layer 565 and the second foam layer 567 include a piezoelectric additive and have been fabricated and poled using a method similar to the method 400 described above with reference to FIG. 4. As illustrated, the first sensor 561 and the second sensor 563 exhibit poling directions that lie, respectively, at a first angle, $\alpha_1$, and at a second angle, $\alpha_2$, with respect to a longitudinal axis A extending along the second foam layer 567, such that $0°<\alpha_1, \alpha_2<90°$ (or $0<\alpha_1, \alpha_2<1.57$ rad). In various embodiments, for example, both the first angle $\alpha_1$ and the second angle $\alpha_2$ equal about 45° (0.785 rad), as illustrated in FIG. 5G. As illustrated, the first sensor 561 includes a first electrode 562 and a second electrode 564 and the second sensor 563 includes a first electrode 566 and a second electrode 568, each of which runs perpendicular to the longitudinal axis A. In various embodiments, the sensor 560 is configured to detect a force that includes components that are both parallel and perpendicular with respect to the longitudinal axis A, similar to the sensor 520 described above with reference to FIG. 5C. In other words, the sensor 560 is configured to detect forces having both normal and shear components. In various embodiments, an insulating layer 569 is disposed between the first sensor 561 and the second sensor 563. In various embodiments, a first thickness of the first foam layer 565 and a second thickness of the second foam layer 567 may be selected to enhance the dynamic range sensitivity of the sensor 560 provided through the use of the first compressibility and the second compressibility having different values. For example, in various embodiments, the first thickness of the first foam layer 565 may be less than the second thickness of the second foam layer 567, while the first foam layer 565 exhibits a soft or relatively high compressibility and the second foam layer 567 exhibits a stiff or relatively low compressibility.

Figure 6A:
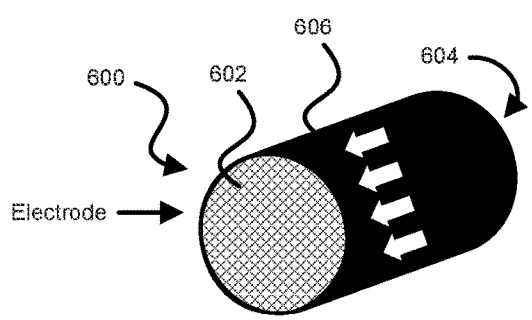
FIGS. 6A, 6B, 6C, and 6D illustrate sensor configurations, in accordance with various embodiments.

Referring now to FIGS. 6A-6D, various sensors having foam layers molded into a variety of shapes are illustrated. A specific shape of a foam layer or a sensor may be selected to fit within a specific or corresponding form factor of a device or to facilitate concentration of the applied loads to be measured or detected by the sensor into the foam layer. Referring to FIG. 6A, for example, a sensor 600 is illustrated having a first electrode 602 and a second electrode 604 configured to sandwich a foam layer 606. In various embodiments, each of the first electrode 602, the second electrode 604 and the foam layer 606 exhibits a circular (or semi-circular or elliptical) cross-sectional shape. The sensor 600 may exhibit a range of aspect ratios (e.g., the ratio of thickness or height of the sensor 600 to a diameter of the electrodes). While the foam layer 606 is illustrated having a poling direction extending perpendicular with respect to the first electrode 602 and the second electrode 604, the disclosure contemplates any poling direction, as described above with reference to FIGS. 5A-5G. Further, the disclosure contemplates the sensor 600 as having a stacked configuration, as also described above with reference to FIGS. 5A-5G.

Figure 6B:
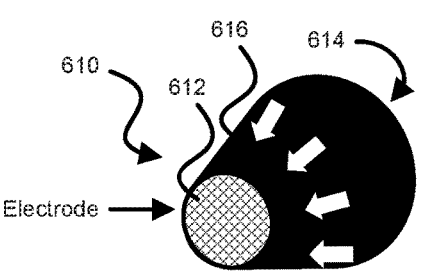

Referring to FIG. 6B, a sensor 610 is illustrated having a first electrode 612 and a second electrode 614 configured to sandwich a foam layer 616. In various embodiments, each of the first electrode 612 and the second electrode 614 exhibit a circular (or semi-circular or elliptical) cross-sectional shape having different diameters, while the foam layer 616 exhibits a conical shape sandwiched by the first electrode 612 and the second electrode 614. The sensor 610 may exhibit a range of aspect ratios (e.g., the ratio of thickness or height of the sensor 610 to an average diameter of the electrodes). While the foam layer 616 is illustrated having a poling direction extending perpendicular with respect to the first electrode 612 and the second electrode 614, the disclosure contemplates any poling direction, as described above with reference to FIGS. 5A-5G. Further, the disclosure contemplates the sensor 610 as having a stacked configuration, as also described above with reference to FIGS. 5A-5G.

Figure 6C:
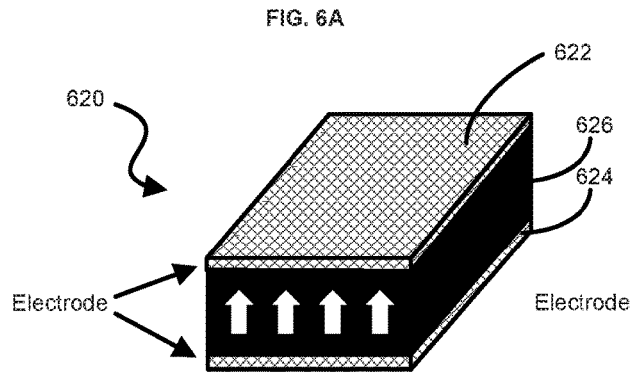

Referring to FIG. 6C, a sensor 620 is illustrated having a first electrode 622 and a second electrode 624 configured to sandwich a foam layer 626. In various embodiments, each of the first electrode 622, the second electrode 624 and the foam layer 626 exhibits a rectangular cross-sectional shape. The sensor 620 may exhibit a range of aspect ratios (e.g., the ratio of thickness or height of the sensor 620 to a characteristic width or length of the electrodes). While the foam layer 626 is illustrated having a poling direction extending perpendicular with respect to the first electrode 622 and the second electrode 624, the disclosure contemplates any poling direction, as described above with reference to FIGS. 5A-5G. Further, the disclosure contemplates the sensor 620 as having a stacked configuration, as also described above with reference to FIGS. 5A-5G.

Figure 6D:
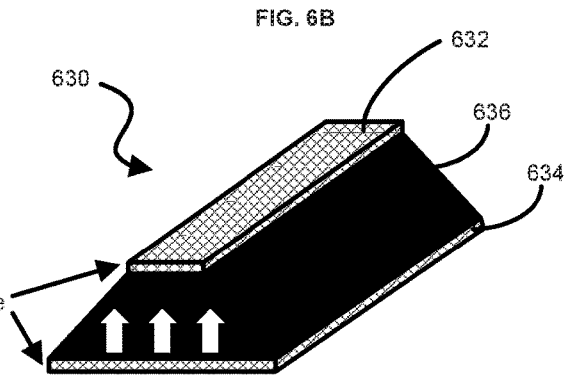

Referring to FIG. 6D, a sensor 630 is illustrated having a first electrode 632 and a second electrode 634 configured to sandwich a foam layer 636. In various embodiments, each of the first electrode 632 and the second electrode 634 exhibit a rectangular cross-sectional shape having different widths, while the foam layer 636 exhibits a trapezoidal shape in cross section, sandwiched by the first electrode 632 and the second electrode 634. The sensor 630 may exhibit a range of aspect ratios (e.g., the ratio of thickness or height of the sensor 630 to a characteristic width or length of the electrodes). While the foam layer 636 is illustrated having a poling direction extending perpendicular with respect to the first electrode 632 and the second electrode 634, the disclosure contemplates any poling direction, as described above with reference to FIGS. 5A-5G. Further, the disclosure contemplates the sensor 630 as having a stacked configuration, as also described above with reference to FIGS. 5A-5G.

Figure 7A:
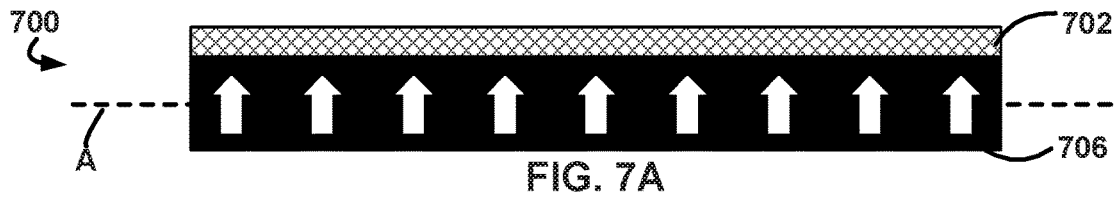
FIGS. 7A, 7B, 7C, 7D, and 7E illustrate sensor configurations, in accordance with various embodiments.

Referring now to FIGS. 7A-7E, schematic views of several triboelectric-based sensors are provided, in accordance with various embodiments. For example, FIG. 7A illustrates a sensor 700 that includes a first electrode 702 attached to a foam layer 706. The foam layer 706 is fabricated using a method similar to the method 400 described above with reference to FIG. 4, but includes no piezoelectric additive and is not subjected to a poling procedure. As illustrated, the first electrode 702 runs parallel to a longitudinal axis A extending through the foam layer 706. As such, the sensor 700 is configured to detect a force that is applied in a direction perpendicular to the longitudinal axis A. In various embodiments, the sensor 700 is configured to generate a signal component from the interface of the first electrode 702 and the foam layer 706 based on the triboelectric effect.

Figure 7B:
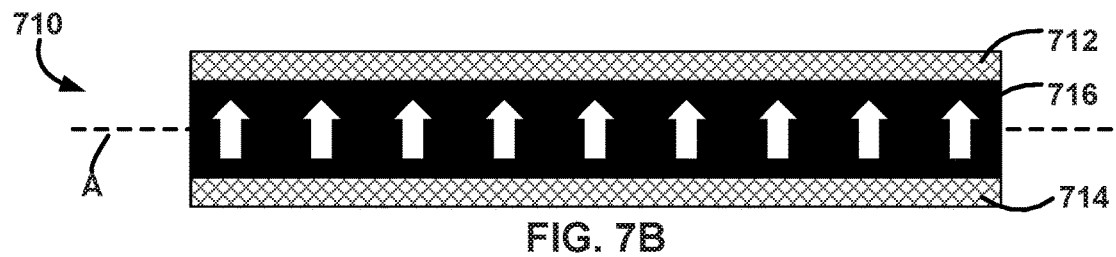

Referring to FIG. 7B, a sensor 710 includes a first electrode 712 and a second electrode 714 attached to a foam layer 716. The foam layer 716 is fabricated using a method similar to the method 400 described above with reference to FIG. 4, but includes no piezoelectric additive and is not subjected to a poling procedure. As illustrated, the first electrode 712 and the second electrode 714 run parallel to a longitudinal axis A extending through the foam layer 716. As such, the sensor 710 is configured to detect a force that is applied in a direction perpendicular to the longitudinal axis A. In various embodiments, the sensor 710 is configured to generate a signal component from the interface of the first electrode 712 and the second electrode 714 and the foam layer 716 based on the triboelectric effect.

Figure 7C:
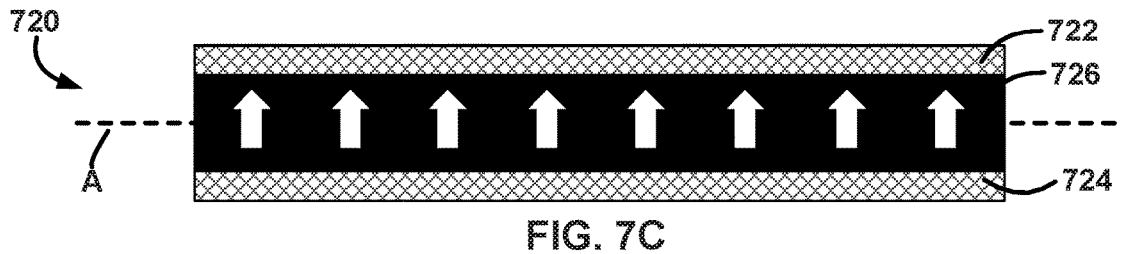

Referring to FIG. 7C, a sensor 720 includes a first electrode 722 and a second electrode 724 attached to a foam layer 726. The foam layer 726 includes a piezoelectric additive and has been fabricated and poled using a method similar to the method 400 described above with reference to FIG. 4. As illustrated, the first electrode 722 and the second electrode 724 run parallel to a longitudinal axis A and perpendicular to the poling direction. As such, the sensor 720 is configured to detect a force that is applied in a direction parallel to the poling direction or perpendicular to the longitudinal axis A. In various embodiments, the sensor 720 is configured to generate a first signal component from the bulk of the foam layer 726, based on the piezoelectric effect, together with a second signal component from the interface of the first electrode 722 and the second electrode 724 and the foam layer 726 based on the triboelectric effect, the latter being useful to detect low level applied loads or event detection and the former to measure the magnitude of applied loads.

Figure 7D:
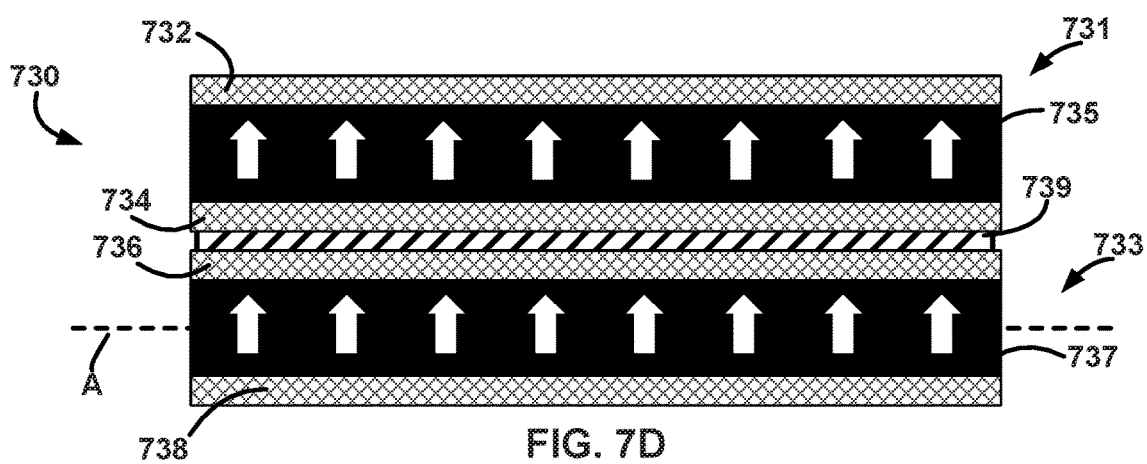

Referring now to FIG. 7D, a sensor 730 is illustrated having a stacked configuration. In various embodiments, the sensor 730 includes a first sensor 731 disposed adjacent (or stacked upon) a second sensor 733 to form the stacked configuration. In various embodiments, the first sensor 731 includes a first foam layer 735 that exhibits a first compressibility, while the second sensor 733 includes a second foam layer 737 that exhibits a second compressibility, where the first compressibility may be greater than, less than or equal to the second compressibility, thereby allowing for measurement of different dynamic ranges of sensing. In various embodiments, both the first foam layer 735 and the second foam layer 737 include a piezoelectric additive and have been fabricated and poled using a method similar to the method 400 described above with reference to FIG. 4. As illustrated, and similar to the sensor 500 and the foam layer 502 described above with reference to FIG. 5A, both the first sensor 731 and the second sensor 733 exhibit a poling direction within the first foam layer 735 and the second foam layer 737, respectively, that is perpendicular to a longitudinal axis A extending along the second foam layer 737. As illustrated, the first sensor 731 includes a first electrode 732 and a second electrode 734 and the second sensor 733 includes a first electrode 736 and a second electrode 738, each of which runs parallel to the longitudinal axis A and perpendicular to the poling direction. In various embodiments, the first electrode 732 and the second electrode 734 of the first sensor 731 are configured to provide a triboelectric signal based on relative movement between one or both of the electrodes and the first foam layer 735. In various embodiments, the sensor 730 is configured to detect a force that is applied in a direction parallel to the poling direction or perpendicular to the longitudinal axis A. In various embodiments, an insulating layer 739 is disposed between the first sensor 731 and the second sensor 733 and configured to insulate the second electrode 734 of the first sensor 731 from the first electrode 736 of the second sensor 733. In various embodiments, a first thickness of the first foam layer 735 and a second thickness of the second foam layer 737 may be selected to enhance the dynamic range sensitivity of the sensor 730 provided through the use of the first compressibility and the second compressibility having different values. For example, in various embodiments, the first thickness of the first foam layer 735 may be less than the second thickness of the second foam layer 737, while the first foam layer 735 exhibits a soft or relatively high compressibility and the second foam layer 737 exhibits a stiff or relatively low compressibility.

Figure 7E:
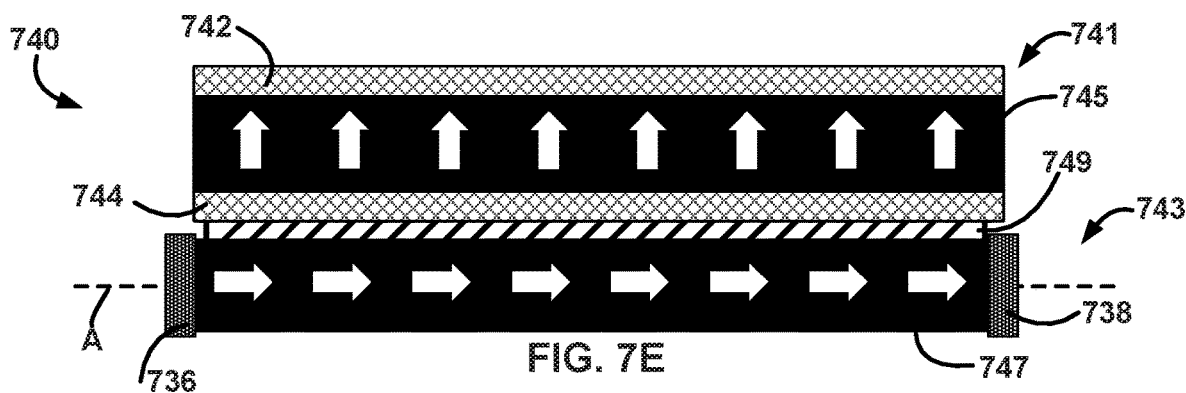

Referring now to FIG. 7E, a sensor 740 is illustrated having a stacked configuration. In various embodiments, the sensor 740 includes a first sensor 741 disposed adjacent (or stacked upon) a second sensor 743 to form the stacked configuration. In various embodiments, the first sensor 741 includes a first foam layer 745 that exhibits a first compressibility, while the second sensor 743 includes a second foam layer 747 that exhibits a second compressibility, where the first compressibility may be greater than, less than or equal to the second compressibility, thereby allowing for measurement of different dynamic ranges of sensing. In various embodiments, both the first foam layer 745 and the second foam layer 747 include a piezoelectric additive and have been fabricated and poled using a method similar to the method 400 described above with reference to FIG. 4. As illustrated, the first sensor 741 and the second sensor 743 exhibit poling directions within the first foam layer 745 and the second foam layer 747, respectively, that are perpendicular to one another—e.g., the poling direction of the first foam layer 745 is perpendicular to a longitudinal axis A extending along the second foam layer 747, while the poling direction of the second foam layer 747 is parallel to the longitudinal axis A. As illustrated, the first sensor 741 includes a first electrode 742 and a second electrode 744 and the second sensor 743 includes a first electrode 746 and a second electrode 748, each of which runs parallel to the longitudinal axis A. In various embodiments, the first electrode 742 and the second electrode 744 of the first sensor 741 are configured to provide a triboelectric signal based on relative movement between one or both of the electrodes and the first foam layer 745. In various embodiments, the sensor 740 is configured to detect a force that includes components that are both parallel and perpendicular with respect to the longitudinal axis A. In other words, the sensor 740 is configured to detect forces having both normal and shear components. In various embodiments, an insulating layer 749 is disposed between the first sensor 741 and the second sensor 743. In various embodiments, a first thickness of the first foam layer 745 and a second thickness of the second foam layer 747 may be selected to enhance the dynamic range sensitivity of the sensor 740 provided through the use of the first compressibility and the second compressibility having different values. For example, in various embodiments, the first thickness of the first foam layer 745 may be less than the second thickness of the second foam layer 747, while the first foam layer 745 exhibits a soft or relatively high compressibility and the second foam layer 747 exhibits a stiff or relatively low compressibility.

Figure 8:
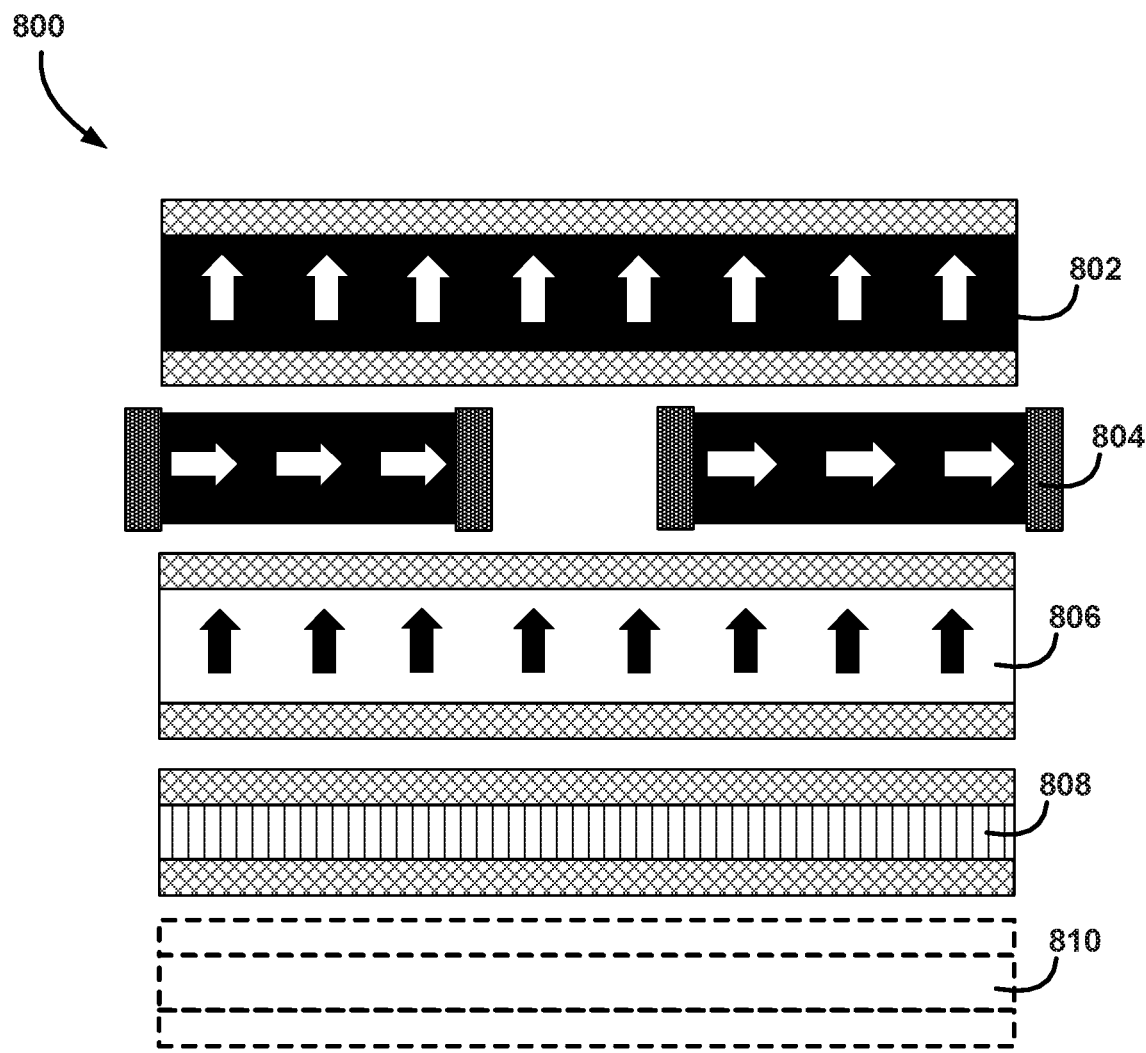
FIG. 8 illustrates a sensor configuration, in accordance with various embodiments.

Referring now to FIG. 8, a sensor 800 is illustrated having a stacked configuration and including a variety of elements of the embodiments already described. In various embodiments, for example, the sensor 800 includes a first sensor 802 that exhibits triboelectric and piezoelectric properties similar to those exhibited by the sensor 720 described above with reference to FIG. 7C. The sensor 800 may further include a second sensor 804 (or a pair of such sensors, as illustrated) having shear-detecting properties similar to those exhibited by the second sensor 543 described above with reference to FIG. 5E. In various embodiments, the sensor 800 may also include a third sensor 806 and a fourth sensor 808, similar to the first sensor 531 and the second sensor 533 described above with reference to FIG. 5D, that include foam layers exhibiting varying degrees of compressibility, thereby allowing for measurement of different dynamic ranges of sensing. As illustrated, the sensor 800 may also include a fifth sensor 810, or any number of any other sensors, having various of the characteristics described above.

As the above description of the various embodiments illustrates, the alignment of the poling can provide sensitivity to motion in specific directions, and it is possible to use multiple sensors having different characteristics (e.g., piezoelectric, triboelectric and poling angle), separately or in combination, in a stacked configuration. Piezoelectric sensors may be configured to measure applied forces or strains across a broad range of levels and in different directions, using various foam and piezoelectric additive formulations, electrode configurations, and sensor sizes and shapes. Individual piezoelectric foam sensors may be configured with application-specific foam properties—e.g., soft compressible foams may be used to measure relatively light forces and stiffer, less-compressible foams may be used to measure relatively higher forces. Triboelectric sensors may also be configured to detect applied forces or strains and various foams, electrode configurations, and sensor sizes and shapes may be used to measure a variety of ranges of forces or strains.

Combinations of piezoelectric sensors with triboelectric sensors may be used to provide a range of measurement capabilities. For example, in the context of human anatomy, relatively large forces or strains resulting from motion due to respiration of a human chest may be detected through piezoelectric effects, while relatively small forces or strains resulting from motion due to a beating heart may be detected through triboelectric effects. In various embodiments, piezoelectric sensors may exhibit a residual triboelectric signal contribution, and if the piezoelectric dopant levels in the foam are sufficiently low, the triboelectric effect may dominate the piezoelectric effect. Sensors that are mechanically restrained to limit surface or electrode movement may be designed to limit undesired noise or signals due to the triboelectric effect and thereby enhance the piezoelectric signal. As discussed further below, this mechanical restraint of sensors is referred to as a "preload" or "preloading."

Referring now to FIGS. 9A-9D, various embodiments of electrodes for use with piezoelectric or triboelectric sensors are illustrated. Before describing the various shapes the electrodes may assume, a brief discussion of various materials used to construct the electrodes and the resulting physical properties is provided. In various embodiments, the electrodes may be adhered or bonded directly to the foam material. In general, such electrodes may be substantially rigid, on the one extreme, or substantially flexible or stretchable on the other. Substantially rigid electrodes may include, for example, hard metals (e.g., steel strips embedded in a circuit substrate), conductive paints, conductive rigid fabrics or conductive epoxies. Substantially flexible electrodes may include, for example, soft metals (e.g., copper strips embedded in a circuit substrate), screen prints, conductive paints, silver nanowires, or conductive flexible fabrics. Examples of various electrodes and adhesives or adhesive methods that may be used to adhere or bond the electrodes to a foam layer include copper electrodes bonded by a conductive glue, direct screen printing of electrodes onto the surfaces of the foam layers, bonding of screen printed electrodes with heat-activated adhesives, bonding of silver nanowires with heat-activated adhesives or bonding of conductive fabrics with heat-activated adhesives or non-conductive glues.

Figure 9A:
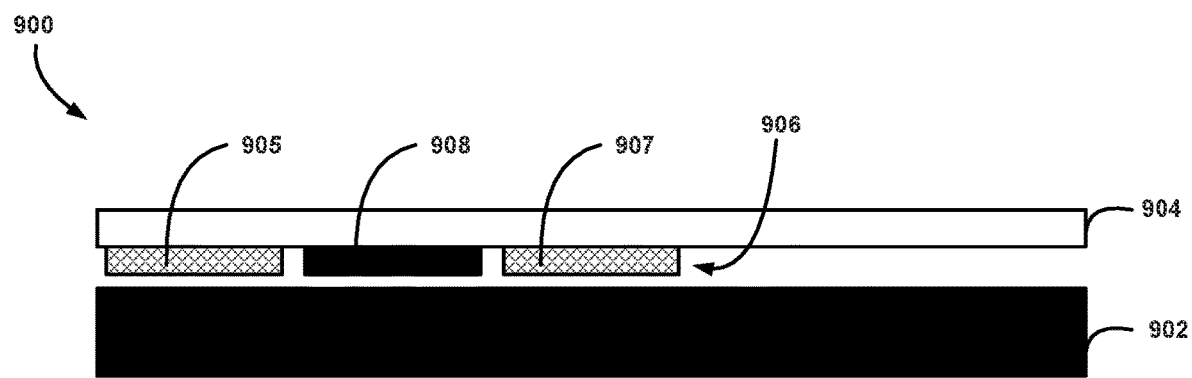
FIGS. 9A, 9B, 9C, and 9D illustrate electrode configurations, in accordance with various embodiments.

Referring now to FIG. 9A, a portion of a sensor 900 is illustrated, in accordance with various embodiments. The sensor 900 includes a foam layer 902 and an overlay layer 904. Sandwiched between the foam layer 902 and the overlay layer 904 is an electrode 906 that includes a first electrode 905 and a second electrode 907 separated by an insulator 908 which, in various embodiments, may comprise an extension of the foam layer 902, the overlay layer 904 or some other material. In various embodiments, the insulator 908 may be simply open space with no material in between the first electrode 905 and the second electrode 907. In such configuration, the shape of the electrode 906 disposed on a surface of the foam layer 902 may provide a "segmented" sensor capability—e.g., the size, shape, and/or positioning of the strips of conductive material comprising the electrode 906 may be configured to provide the sensor 900 with the ability to detect localized and temporal force and strain information.

Figure 9B:
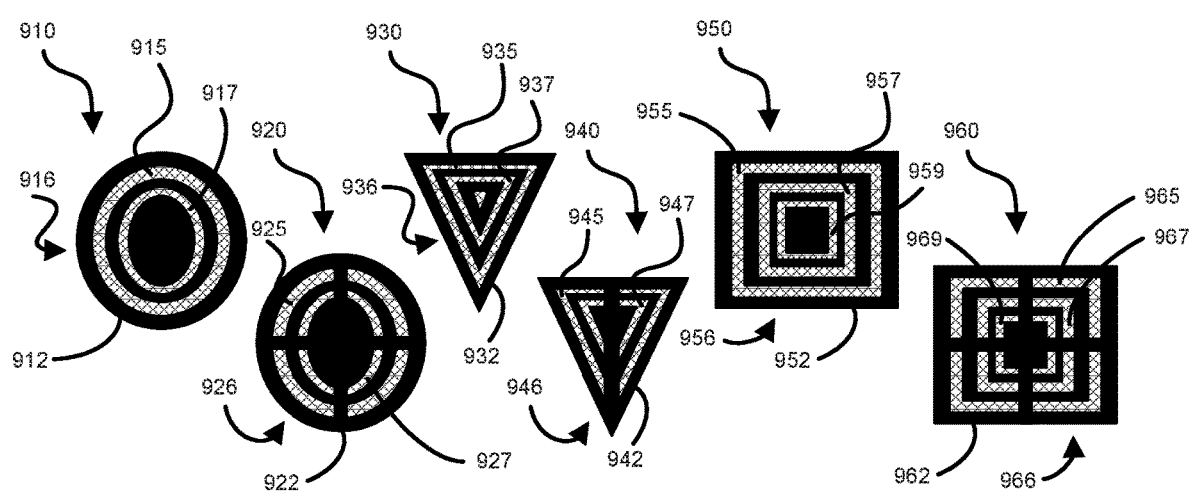
Figure 9C:
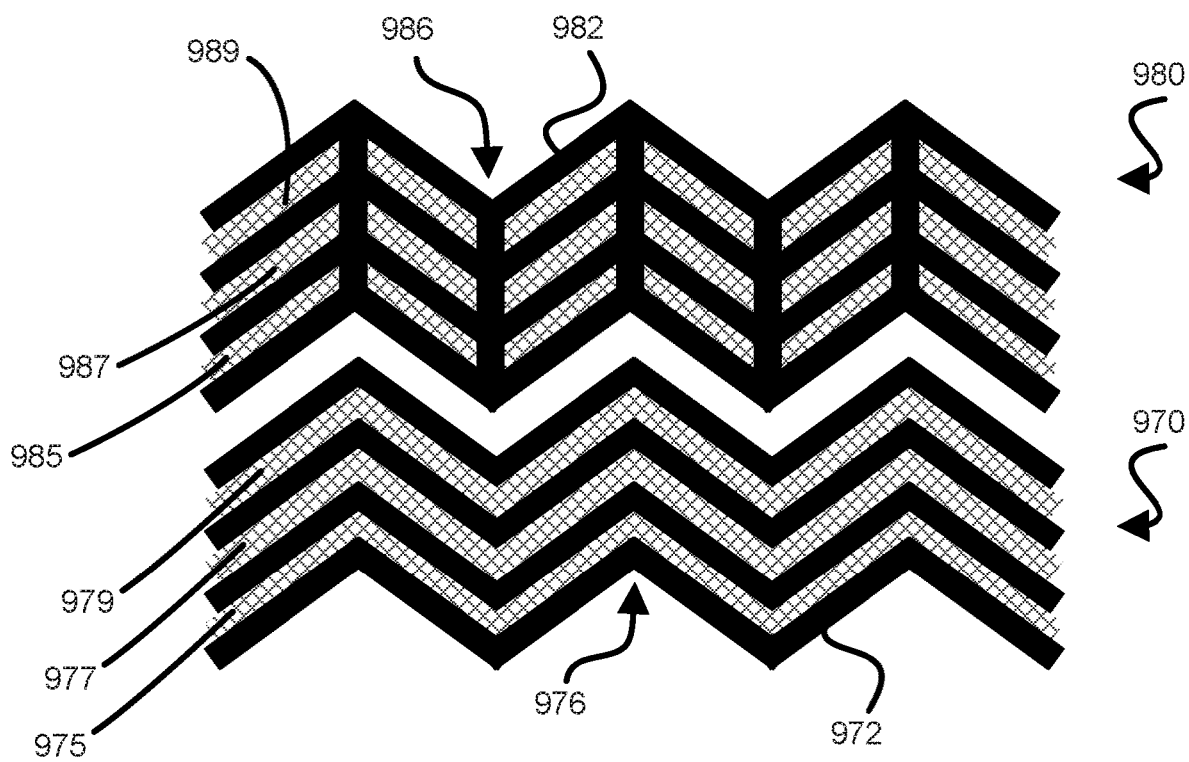
Figure 9D:
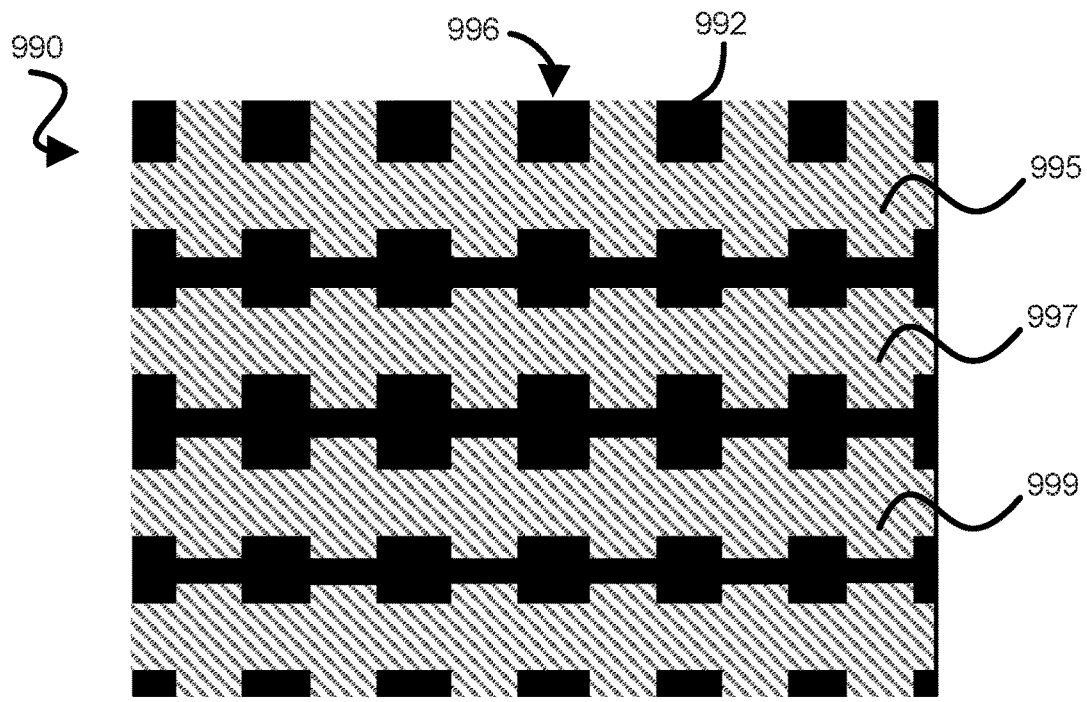

Referring to FIGS. 9B-9D, various segmented electrodes are illustrated, in accordance with various embodiments. In FIG. 9B, a sensor 910 includes a circular electrode configuration 916 having a first electrode 915 and a second electrode 917 extending in a circular manner about a foam layer 912, which also has a circular shape. With such configuration, the sensor 910 is able to provide a higher resolution of the applied load or strains occurring on or against the foam layer 912, or within the region covered by the circular shape of the foam layer 912, than may be provided by a single electrode that extends across the entire area of the region covered by the circular shape of the foam layer 912. In an alternative embodiment, a sensor 920 includes a circular electrode configuration 926 having a first electrode 925 and a second electrode 927 extending in a circular manner about a first quadrant of a foam layer 922, which also has a circular shape. As illustrated, the sensor 920 (or the circular electrode configuration 926) includes eight individual electrodes, which provides four times the spatial resolution than does the sensor 910.

Also illustrated in FIG. 9B, a sensor 930 includes a triangular electrode configuration 936 having a first electrode 935 and a second electrode 937 extending in a triangular manner about a foam layer 932, which also has a triangular shape. With such configuration, the sensor 930 is able to provide a higher resolution of the applied load or strains occurring on or against the foam layer 932, or within the region covered by the triangular shape of the foam layer 932, than may be provided by a single electrode that extends across the entire area of the region covered by the triangular shape of the foam layer 932. In an alternative embodiment, a sensor 940 includes a triangular electrode configuration 946 having a first electrode 945 and a second electrode 947 extending in a triangular manner about a first half of a foam layer 942, which also has a triangular shape. As illustrated, the sensor 940 (or the triangular electrode configuration 946) includes four individual electrodes, which provides two times the spatial resolution than does the sensor 930.

Also illustrated in FIG. 9B, a sensor 950 includes a rectangular electrode configuration 956 having a first electrode 955, a second electrode 957 and a third electrode 959 extending in a rectangular manner about a foam layer 952, which also has a rectangular shape. With such configuration, the sensor 950 is able to provide a higher resolution of the applied load or strains occurring on or against the foam layer 952, or within the region covered by the rectangular shape of the foam layer 952, than may be provided by a single electrode that extends across the entire area of the region covered by the rectangular shape of the foam layer 952. In an alternative embodiment, a sensor 960 includes a rectangular electrode configuration 966 having a first electrode 965, a second electrode 967 and a third electrode 969 extending in a rectangular manner about a first quadrant of a foam layer 962, which also has a rectangular shape. As illustrated, the sensor 960 (or the rectangular electrode configuration 966) includes twelve individual electrodes, which provides four times the spatial resolution than does the sensor 950.

Referring to FIG. 9C, a sensor 970 includes a zig-zag electrode configuration 976 having a first electrode 975, a second electrode 977 and a third electrode 979 extending in a zig-zag manner about a foam layer 972, which also has a zig-zag shape. With such configuration, the sensor 970 is able to provide a higher resolution of the applied load or strains occurring on or against the foam layer 972, or within the region covered by the zig-zag shape of the foam layer 972, than may be provided by a single electrode that extends across the entire area of the region covered by the zig-zag shape of the foam layer 972. In an alternative embodiment, a sensor 980 includes a zig-zag electrode configuration 986 having a first electrode 985, a second electrode 987 and a third electrode 989 extending in a zig-zag manner about a first section (or length) of a foam layer 982, which also has a zig-zag shape. As illustrated, the sensor 980 (or the zig-zag electrode configuration 986) includes eighteen individual electrodes, which provides six times the spatial resolution than does the sensor 970.

Referring to FIG. 9D, a sensor 990 includes a square-wave electrode configuration 996 having a first electrode 995, a second electrode 997 and a third electrode 999 extending in a square-wave manner about a foam layer 992, which has a rectangular shape. With such configuration, the sensor 990 is able to provide a higher resolution of the applied load or strains occurring on or against the foam layer 992, or within the region covered by the rectangular shape of the foam layer 992, than may be provided by a single electrode that extends across the entire area of the region covered by the rectangular shape of the foam layer 992.

Figure 10:
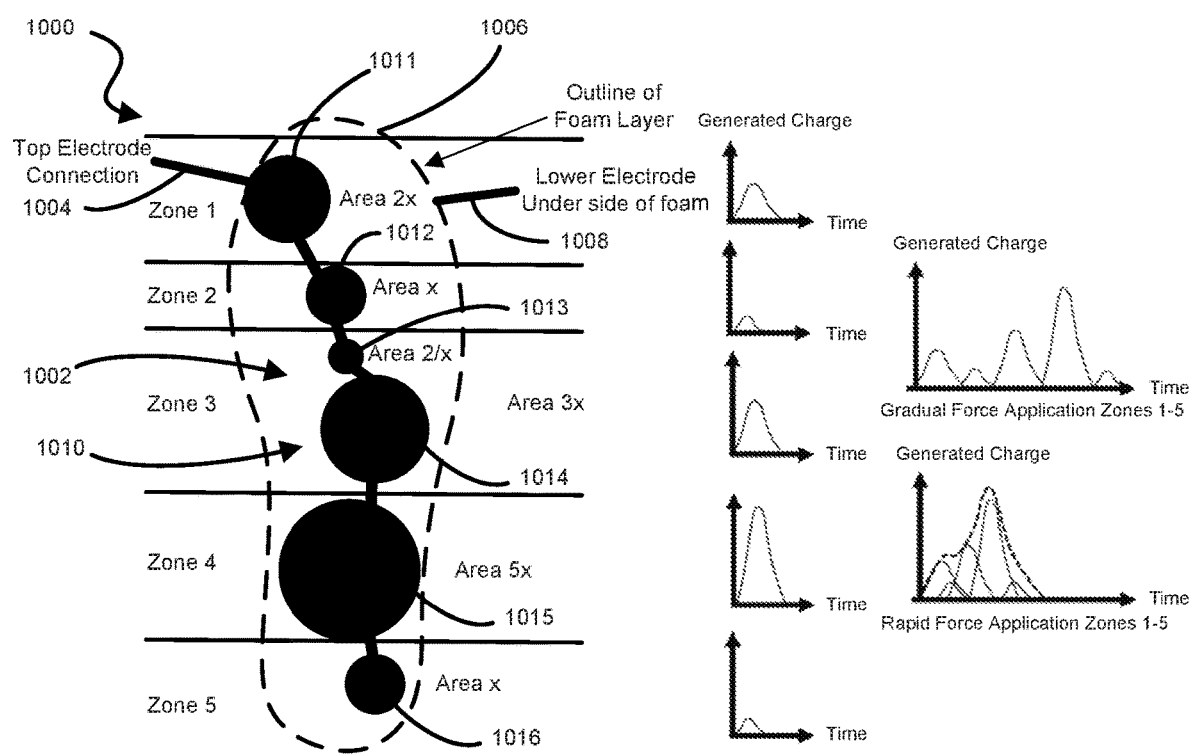
FIG. 10 illustrates a system configured to detect and process an applied force, in accordance with various embodiments.
Figure 11:
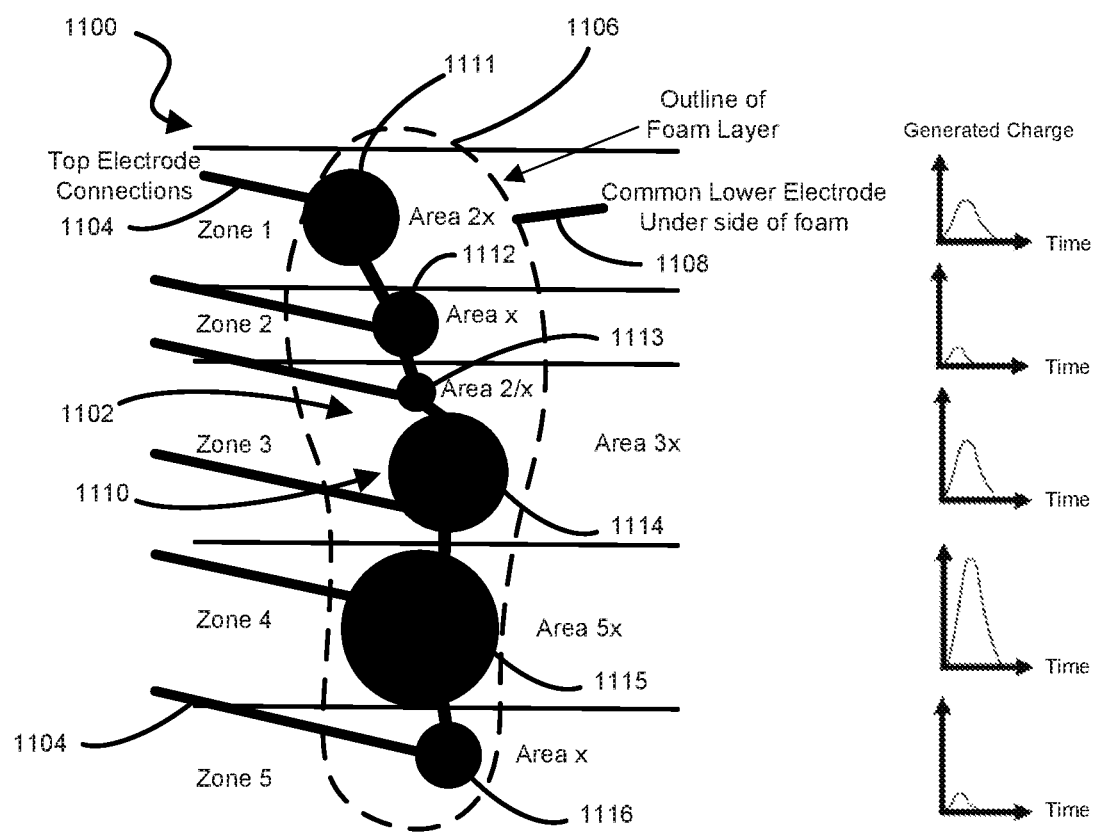
FIG. 11 illustrates a system configured to detect and process an applied force, in accordance with various embodiments.

Referring now to FIGS. 10 and 11, two sensor configurations are described, in accordance with various embodiments. While the sensor configurations are described in the context of footwear (e.g., a sole of a shoe), the disclosure contemplates various applications not limited to footwear where analysis of loads or strains occurring upon or within a region of interest is concerned. Referring to FIG. 10, for example, a sensor configuration 1000 is illustrated in the context of a sole of a shoe. In various embodiments, the sensor configuration 1000 includes an electrode system 1002 having an upper electrode 1004 disposed on an upper surface of a foam layer 1006 in the shape of a sole of a shoe and a lower electrode 1008 disposed on a lower surface of the foam layer 1006. As illustrated, the upper electrode 1004 includes a plurality of electrode pads 1010, including a first electrode pad 1011, a second electrode pad 1012, a third electrode pad 1013, a fourth electrode pad 1014, a fifth electrode pad 1015 and a sixth electrode pad 1016 disposed at various regions of interest on the upper surface of the foam layer 1006. Each of the plurality of electrode pads 1010 is connected in series and corresponds to a specific location of the sole. Further, in various embodiments, each of the plurality of electrode pads 1010 may be sized such that the level of a resulting signal will vary depending on the area of the region of interest activated. As illustrated, for example, the first electrode pad 1011 may have an areal size twice the areal size of the second electrode pad 1012. Similarly, the fifth electrode pad 1015 may have an areal size five times the areal size of both the second electrode pad 1012 and the sixth electrode pad 1016. In various embodiments, the lower electrode 1008 is identical or substantially identical to the upper electrode 1004, providing a plurality of series-connected sensors extending from the heel to the toe of the sole of the shoe.

As illustrated by the graphs of generated charge (or signal strength) versus time, each of the plurality of electrode pads 1010 contributes to the resulting signal as the sole of the shoe experiences loading from the heel toward the toe of the shoe, which is a loading pattern typical of walking (e.g., the load is applied first at the heel and last at the toe of the shoe). As illustrated, since the plurality of electrode pads 1010 is connected in series, the contribution of each electrode pad (see, e.g., the series of graphs adjacent each zone of the sole) appears as a single continuous signal versus time. As indicated by comparing the generated charge graphs showing a gradual force application against a rapid force application, where the loading from heel to toe is applied gradually, the signal is spread out over a longer period of time than where the load is applied rapidly. In this case, the generated signal will increase in direct relation to the location where the load or strain is applied across the surface area. This approach is ideally suited to a triboelectric based sensor, where such an electrode design may be added on top of an existing non-piezoelectric activated foam layer in a shoe.

Referring now to FIG. 11, a variant of the foregoing embodiments is illustrated where a plurality of electrode pads 1110 is disposed on the upper surface of a foam layer 1106 and measurements are generated from each of the individual members of the plurality of electrode pads 1110. More specifically, a sensor configuration 1100 is illustrated in the context of a sole of a shoe. In various embodiments, the sensor configuration 1100 includes an electrode system 1102 having an upper electrode 1104 disposed on an upper surface of the foam layer 1106 in the shape of a sole of a shoe and a lower electrode 1108 disposed on a lower surface of the foam layer 1106. As illustrated, the upper electrode 1104 includes the plurality of electrode pads 1110, including a first electrode pad 1111, a second electrode pad 1112, a third electrode pad 1113, a fourth electrode pad 1114, a fifth electrode pad 1115 and a sixth electrode pad 1116 disposed at various regions of interest on the upper surface of the foam layer 1106. Each of the plurality of electrode pads 1110 is connected individually to form a plurality of sensors, rather than the single sensor described above with reference to FIG. 10. Similar to the above description, however, in various embodiments, each of the plurality of electrode pads 1110 may be sized such that the level of a resulting signal will vary depending on the area of the region of interest activated. As illustrated, for example, the first electrode pad 1111 may have an areal size twice the areal size of the second electrode pad 1112. Similarly, the fifth electrode pad 1115 may have an areal size five times the areal size of both the second electrode pad 1112 and the sixth electrode pad 1116. In various embodiments, the lower electrode 1108 may comprise a single common electrode or may comprise a series of electrodes that is identical or substantially identical to the plurality of electrode pads 1110 forming the upper electrode 1104, providing a plurality of individually connected sensors extending from the heel to the toe of the sole of the shoe. As illustrated by the graphs of generated charge (or signal strength) versus time, each of the plurality of electrode pads 1110 provides a single signal representing the force or strain occurring at its specific location of the sole as the sole of the shoe experiences loading from the heel toward the toe of the shoe, which is a loading pattern typical of walking (e.g., the load is applied first at the heel and last at the toe of the shoe).

Figure 12:
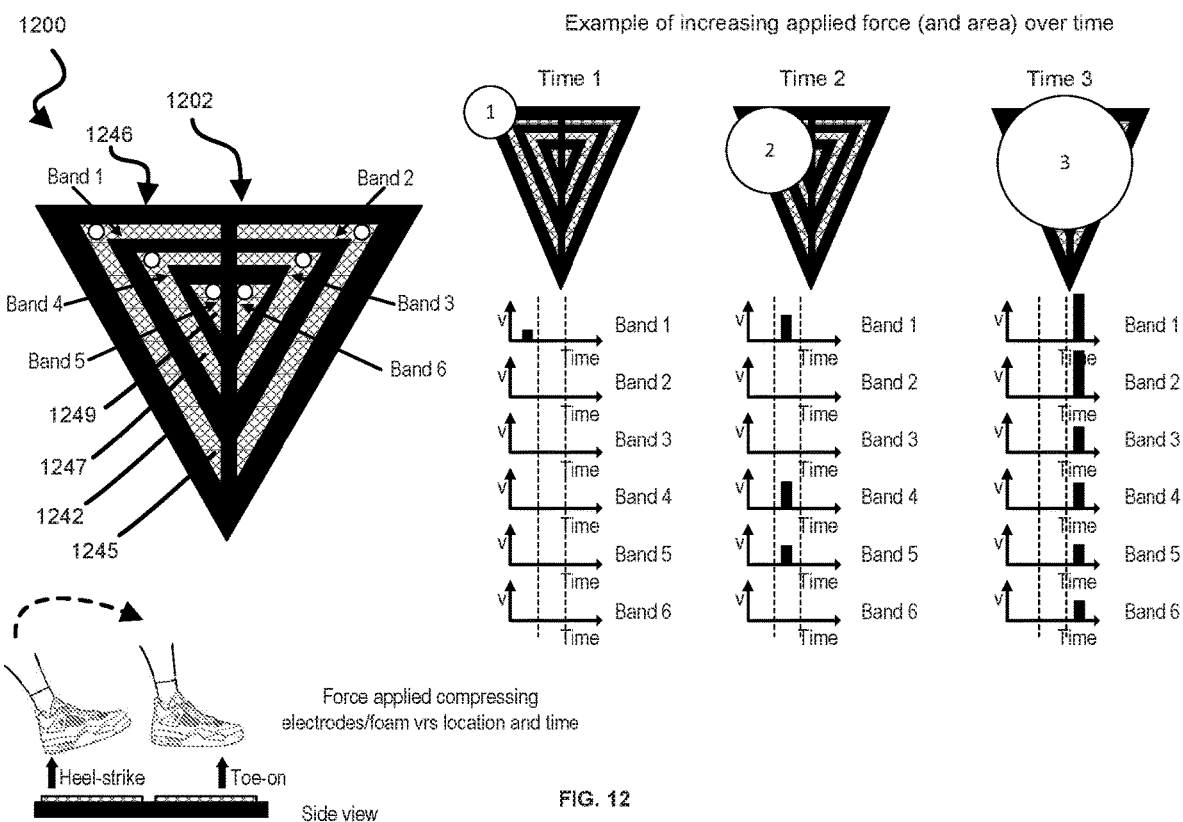
FIG. 12 illustrates a system configured to detect and process an applied force, in accordance with various embodiments.

Referring now to FIG. 12, a sensor 1200 having a plurality of electrodes 1202 is illustrated, together with exemplar signal outputs in the context of a loading pattern typical of walking. Similar to the sensor 940 described above with reference to FIG. 9B, the sensor 1200 includes a triangular electrode configuration 1246 having a first electrode 1245, a second electrode 1247 and a third electrode 1249 extending in a triangular manner about a first half of a foam layer 1242, which also has a triangular shape. A similar electrode configuration is provided on a second half of the foam layer 1242 to provide a spatial resolution comprising six bands of electrodes (e.g., Band 1, Band 2 . . . Band 6). Three time levels are indicated (e.g., Time 1, Time 2 and Time 3) as the load is applied to the sensor 1200, with the load at each time level including an increasingly larger area of the sensor 1200. At Time 1, only Band 1 is activated (via the first electrode 1245) and, as indicated in the corresponding graph, the measured load via a received signal from the first electrode 1245 is registered. At Time 2, each of Band 1, Band 4 and Band 5 are activated (via the first electrode 1245, the second electrode 1247 and the third electrode 1249) and, as indicated in the corresponding graph, the measured loads via a received signal from each of the first electrode 1245, the second electrode 1247 and the third electrode 1249 are registered. Similarly, at Time 3, each of Band 1, Band 2 . . . and Band 6 are activated (via the first electrode 1245, the second electrode 1247, the third electrode 1249 and the corresponding electrodes on the second half of the foam layer 1242) and, as indicated in the corresponding graph, the measured loads via a received signal from each of the plurality of electrodes 1202 are registered. Advantageously, the signals registered in the different bands can provide information concerning both a magnitude and a location of the applied load. Further, the registered signals (either piezoelectric or triboelectric) can be processed for basic event detection (as shown above), or individually digitized over time, using an analog-to-digital (A/D) converter to provide more detailed time resolution for the event. Multiple individual sensors, as illustrated, for example, in FIG. 1A and FIG. 11, may be configured to provide similar resolution, both spatial and temporal. In various embodiments having multiple individual sensors, the corresponding processor or circuitry (e.g., the processor 104 described above with reference to FIGS. 1A-1C) will employ multiple channels to gather data from each individual sensor and, as described previously, process the signals to generate information concerning event detection or temporal and special loading history.

Referring now to FIGS. 13A-13C and 14A-14C, various embodiments having a "preload," as referred to previously, are described. In various embodiments, a sensor, including one or more of the embodiments described above, exhibit a dominant (and potentially noisy and erratic) triboelectric signal component when compared with the piezoelectric signal component. To separate, filter or reduce the triboelectric signal component, and thereby isolate the piezoelectric signal component, a preload may be applied via a small compressive force against the sensor. The preload helps to minimize any electrode movement with respect to a foam layer that may otherwise generate the triboelectric signal component.

Figure 13A:
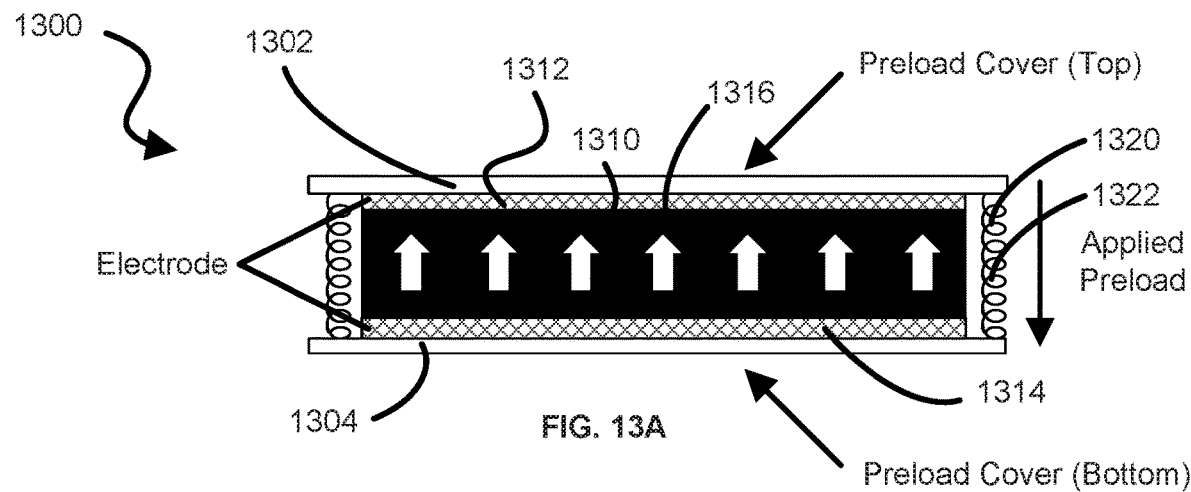
FIGS. 13A, 13B and 13C illustrate a system configured to provide a preload to a sensor, in accordance with various embodiments.
Figure 13B:
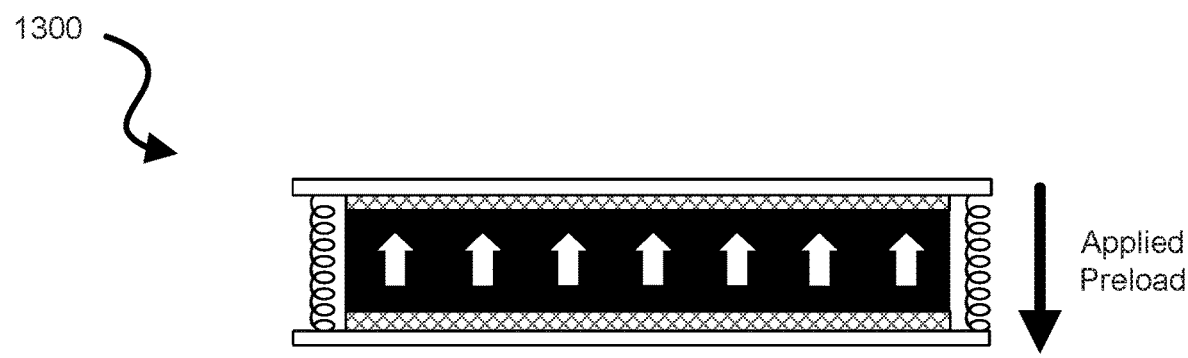
Figure 13C:
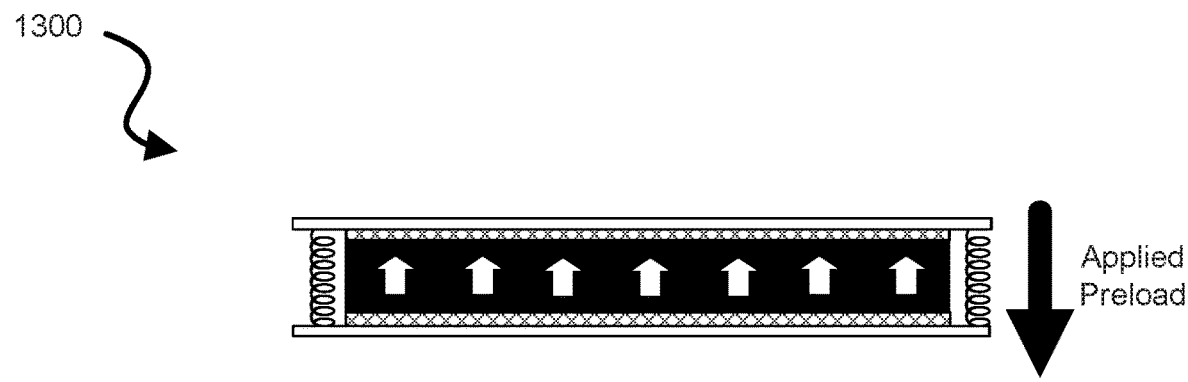

Referring to FIG. 13A, for example, a preloading system 1300 is illustrated, in accordance with various embodiments. The preloading system 1300 includes an upper cover 1302 (or a first cover) and a lower cover 1304 (or a second cover) configured to sandwich a sensor 1310, which includes an upper electrode 1312 (or a first electrode) and a lower electrode 1314 (or a second electrode) disposed on either side of a foam layer 1316. A bias element 1320, which, for example, may include one or more springs 1322, is configured to apply a compressive load between the upper cover 1302 and the lower cover 1304, such that the upper electrode 1312 and the lower electrode 1314 are constrained or restrained against movement with respect to the foam layer 1316. As illustrated in FIGS. 13B and 13C, as the applied preload is increased, the upper electrode 1312 and the lower electrode 1314 are increasingly constrained or restrained against movement with respect to the foam layer 1316 by forcing the electrodes into the foam layer 1316 such that it becomes increasingly compressed.

Application of a mechanical preload configured to constrain the upper electrode 1312 and the lower electrode 1314 against movement with respect to the foam layer 1316 may be accomplished in various ways, including, for example, application of a coating about the sensor 1310 that shrinks during curing or application of a surrounding material that, by its presence, helps constrain the upper electrode 1312 and the lower electrode 1314 from movement with respect to the foam layer 1316.

Figure 14A:
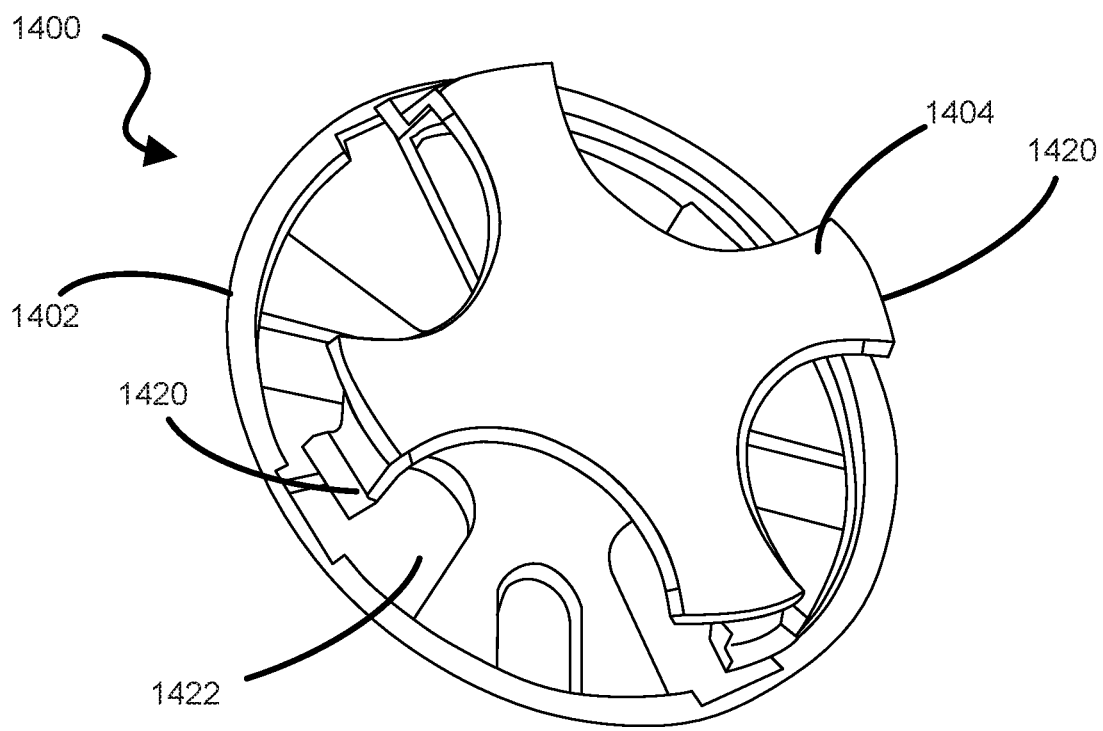
FIGS. 14A, 14B and 14C illustrate a system configured to provide a preload to a sensor, in accordance with various embodiments.
Figure 14B:
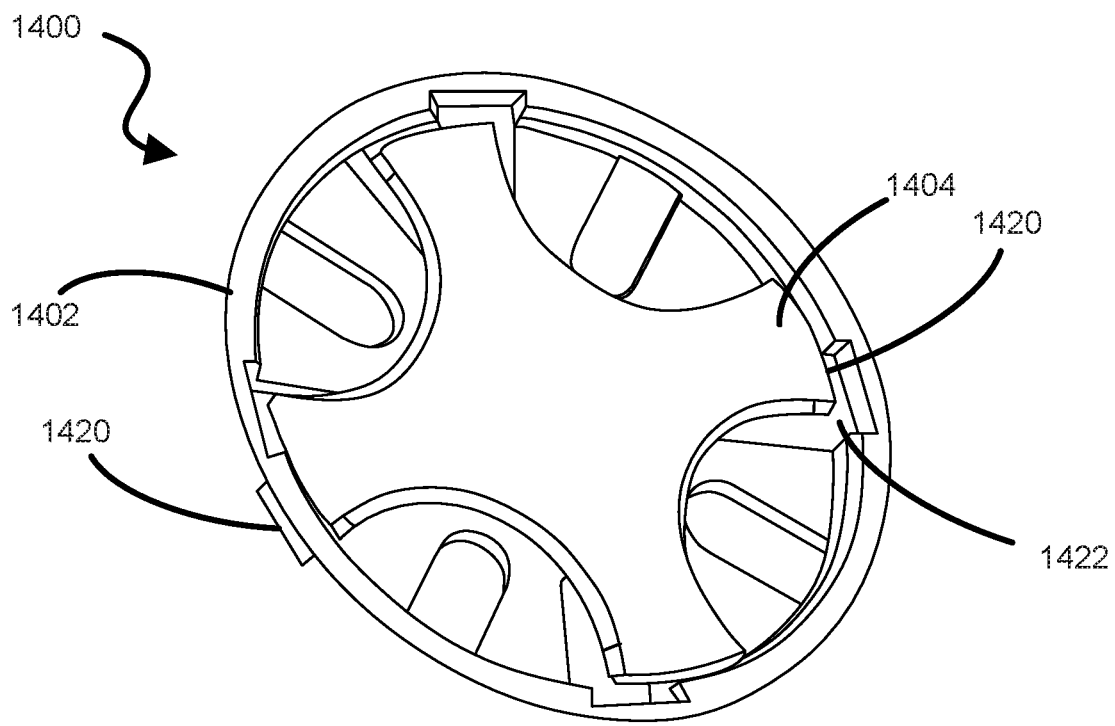
Figure 14C:
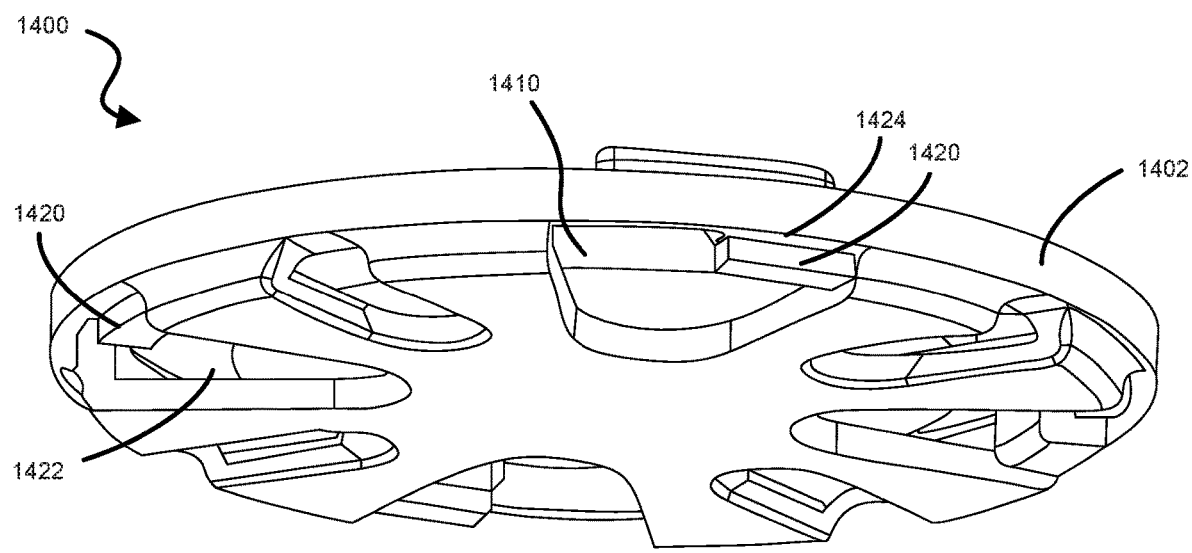
Figure 15A:
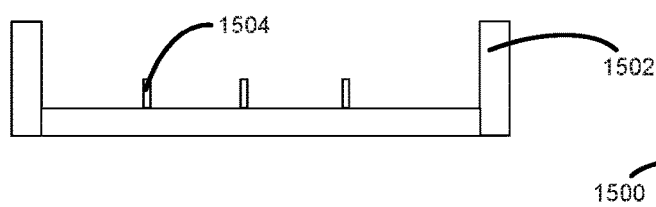
FIGS. 15A, 15B, 15C, 15D and 15E illustrate a system configured to encapsulate a sensor, in accordance with various embodiments.
Figure 15B:
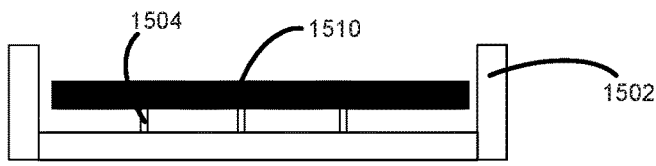
Figure 15C:
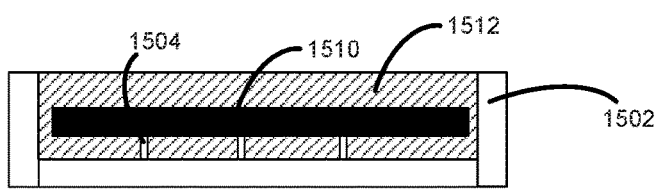
Figure 15D:
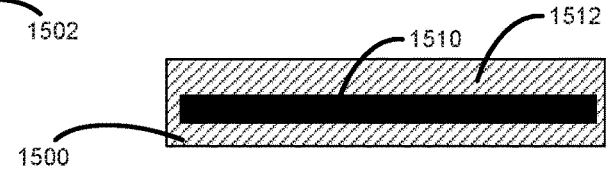
Figure 15E:
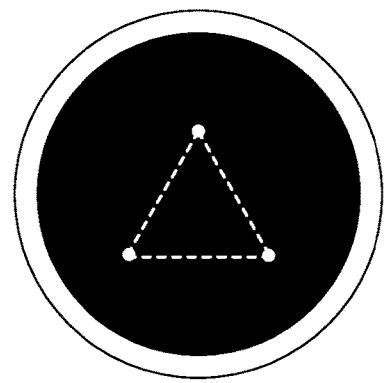

Referring to FIGS. 14A, 14B and 14C, a mechanical device may also be employed to affect sufficient preloading to suppress undesired triboelectric signals. Similar to the conceptual description above, a preloading system 1400 is illustrated, in accordance with various embodiments. The preloading system 1400 includes an upper cover 1402 (or a first cover) and a lower cover 1404 (or a second cover) configured to sandwich a sensor 1410, which includes an upper electrode and a lower electrode disposed on either side of a foam layer, similar to the upper electrode 1312, the lower electrode 1314 and the foam layer 1316 described above. A compressive load between the upper electrode and the lower electrode, sufficient to provide a compressive load against the sensor 1410, is provided by the structure of the upper cover 1402 and the lower cover 1404. For example, the lower cover 1404 may include a tab 1420 (or a plurality of tabs) and the upper cover 1402 may include an opening 1422 (or a plurality of openings) configured to receive the tab 1420 and a lip 1424 adjacent the opening that is configured to lock the tab 1420, such that the upper cover 1402 and the lower cover 1404 are engaged with one another and configured to compress the sensor 1410, as illustrated in FIG. 14C. More specifically, the sensor 1410 may be positioned between the upper cover 1402 and the lower cover 1404, the tab 1420 may be placed into the opening 1422 followed by the upper cover 1402 being compressed and rotated against the lower cover 1404, such that the tab 1420 engages the lip 1424 of the upper cover 1402, thereby locking the upper cover 1402 against the lower cover 1404. Compression of the sensor between the upper cover 1402 and the lower cover 1404 provides the preload against the sensor 1410.

In certain sensing applications, e.g., with footwear, a foam environment is present, enabling a sensor to be incorporated within an existing foam structure, thereby obviating the need for separate environmental protection. In other applications, where the sensor may be exposed to extreme levels of temperature or moisture, a manner of environmental protection may be required to encapsulate the sensor. Referring now to FIGS. 15A-15E, various steps in fabricating an encapsulated sensor 1500 are illustrated, together with the components thereof. In accordance with various embodiments, the encapsulated sensor 1500 includes a housing 1502 and a support pin 1504 (or a plurality of support pins configured to float a sensor 1510 within the housing 1502) extending from a base member of the housing 1502 (see FIG. 15A). In a first step in constructing the encapsulated sensor 1500, the sensor 1510 is positioned within the housing 1502, supported by the support pin 1504 (see FIG. 15B). In a second step, the housing 1502, containing the sensor 1510, is filled with PDMS or, more generally, a potting encapsulant 1512 (see FIG. 15C). The potting encapsulant is then allowed to cure, sealing the sensor 1510 within the housing to provide the encapsulated sensor 1500 (see FIGS. 15D and 15E). Following curing, the housing 1502 and the support pin 1504 (or the plurality of support pins) may be removed, leaving the sensor 1510 surrounded by only the potting encapsulant 1512.

Figure 16:
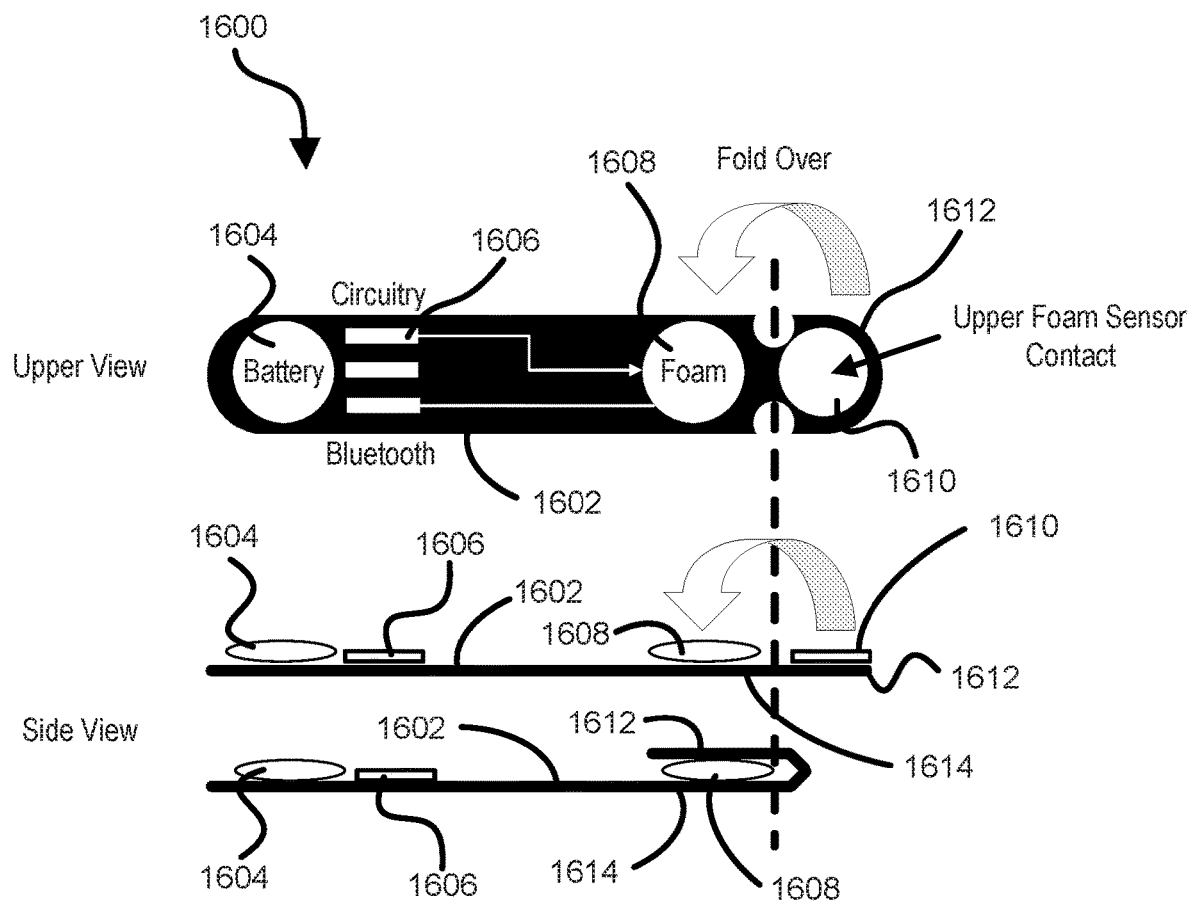
FIG. 16 illustrates a sensing system, in accordance with various embodiments.

Referring now to FIG. 16, a sensing system 1600 and a method of fabricating the same is illustrated, in accordance with various embodiments. Referring to the drawings, for example, the sensing system 1600 includes a base layer 1602 upon which is disposed a power source 1604, control circuitry 1606, and a foam layer 1608. An upper electrode 1610 may be disposed on a flexible or fold-over section 1612 of the base layer 1602. As illustrated, the upper electrode 1610 and the fold-over section 1612 of the base layer 1602 may be folded over to contact the foam layer 1608, thereby configuring the sensing system 1600 in a manner as described above, where a sensor typically includes at least one electrode in contact with the foam layer 1608. In various embodiments, a lower electrode 1614 may be disposed on the base layer 1602 underneath and in contact with the foam layer 1608 to provide a second electrode.

Figures 17A, 17B, 17C:
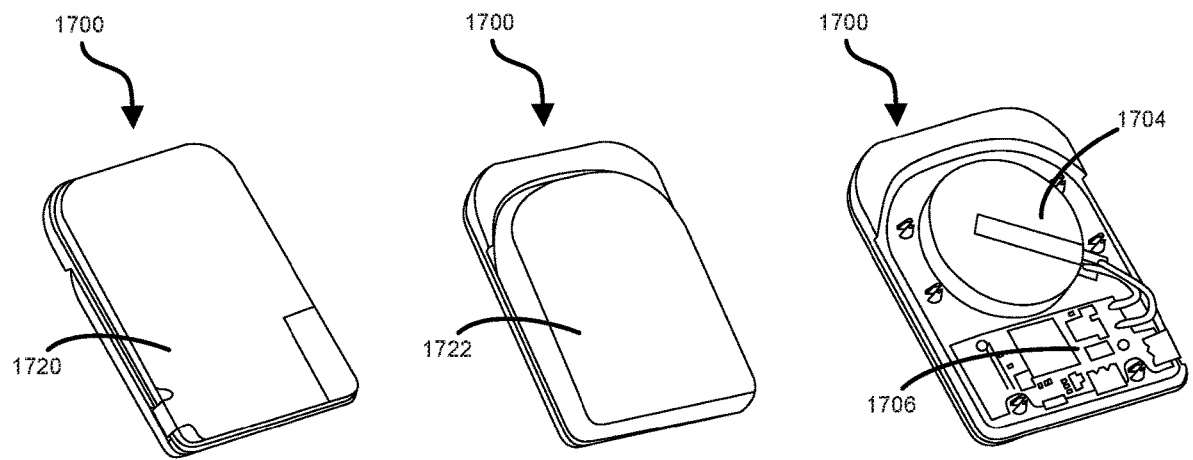
FIGS. 17A, 17B and 17C illustrate a sensing system, in accordance with various embodiments.

Referring now to FIGS. 17A-17C, a sensing system 1700 is illustrated. In various embodiments, the sensing system 1700 may be fabricated in a manner similar to the fabrication of the sensing system 1600 as described above with reference to FIGS. 16A-16C. Once fabricated, the sensing system 1700 includes a front cover 1720 (see FIG. 17A) and a back cover 1722 (see FIG. 17B). In various embodiments, the front cover 1720 and the back cover 1722 may comprise a single piece base layer, such as, for example, the base layer 1602 described above with reference to FIGS. 16A-16C. In various embodiments, the sensing system 1700 includes a power source 1704 and control circuitry 1706, also similar to the power source 1604 and the control circuitry 1606 just described. In various embodiments, the compact and integral nature of the sensing system 1700 facilitates incorporation of the unit into products undergoing fabrication of following fabrication.

Figure 18A:
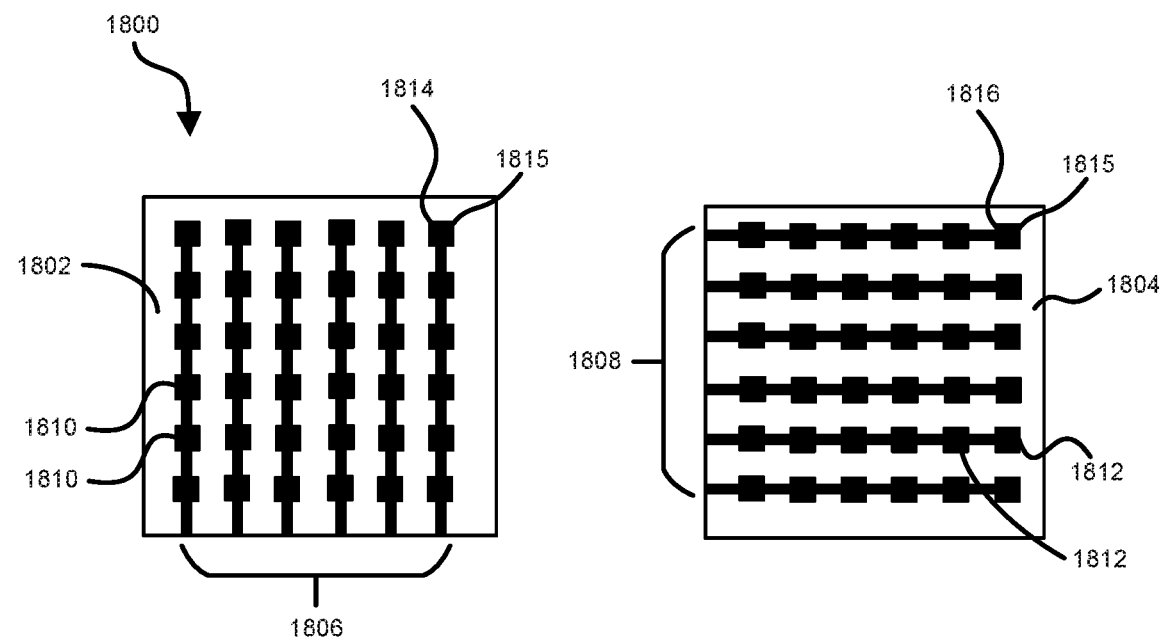
FIGS. 18A and 18B illustrate a shared electrode configuration in a mat and a data collection system for the shared electrode configuration, in accordance with various embodiments.
Figure 18B:
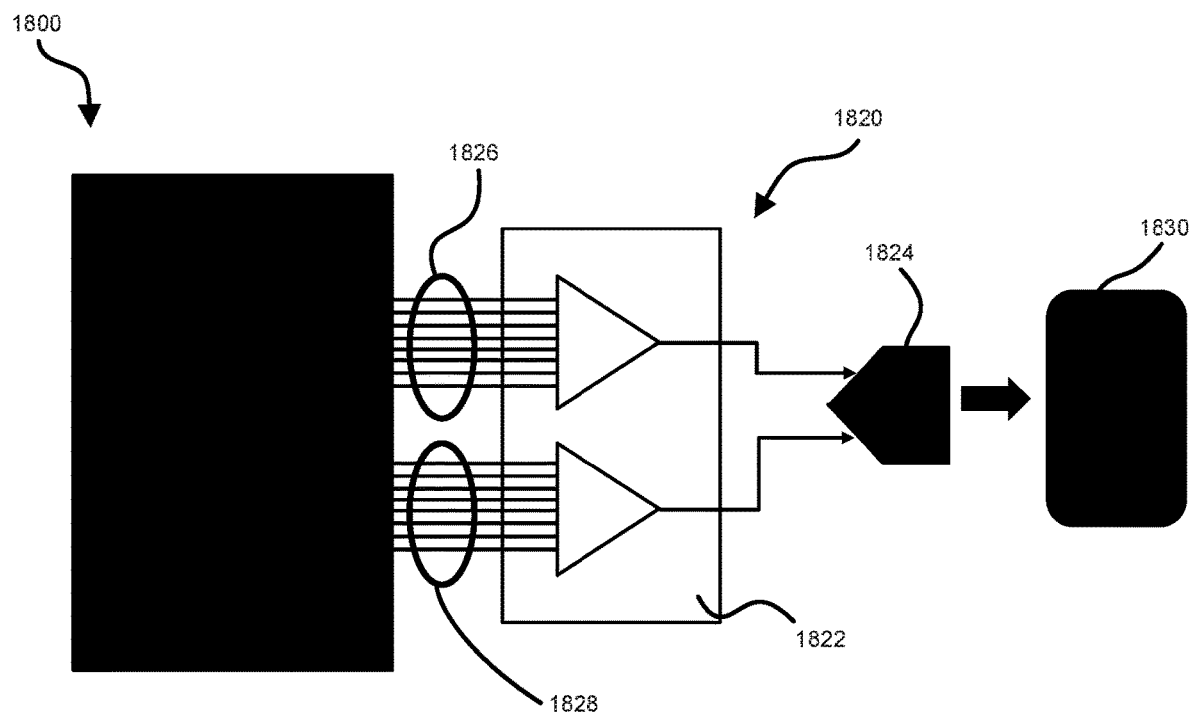

Referring now to FIGS. 18A and 18B, large-area foam mats having pressure sensing capabilities distributed throughout the foam mats are illustrated, in accordance with various embodiments. For example, referring to FIG. 18A, a foam mat 1800 is illustrated having an upper surface 1802 (or a top surface) and a lower surface 1804 (or a bottom surface). The foam mat 1800 possesses piezoelectric or triboelectric properties throughout a volume of the foam mat, which may include an isolated area of the foam mat or the entire surface area of the foam mat. An upper plurality of shared electrodes 1806 is distributed on the upper surface 1802 and a lower plurality of shared electrodes 1808 is distributed on the lower surface 1804. In various embodiments, each of the upper plurality of shared electrodes 1806 includes a plurality of upper electrode pads 1810 connected in series. Similarly, each of the lower plurality of shared electrodes 1808 includes a plurality of lower electrode pads 1812 connected in series. In various embodiments, each of the upper electrode pads (e.g., a first upper electrode pad 1814) is positioned opposite a corresponding one of the lower electrode pads (e.g., a first lower electrode pad 1816). This configuration enables the foam mat 1800 to include any number of foam sensors (e.g., a first foam sensor 1815) distributed throughout the surface area of the foam mat 1800, with each such foam sensor comprising an upper electrode pad and a lower electrode pad that sandwich a portion of the foam mat. For example, the first foam sensor 1815 comprises the first upper electrode pad 1814 and the first lower electrode pad 1816 and the portion of the foam mat sandwiched therebetween.

Referring to FIG. 18B, a data collection system 1820 configured for use with the foam mat 1800 described above is illustrated. In various embodiments, the data collection system 1820 includes an analog multiplexer 1822 and an analog-to-digital converter 1824. The analog multiplexer 1822 includes a first plurality of inputs 1826 configured to connect to the upper plurality of shared electrodes 1806 and a second plurality of inputs 1828 configured to connect to the lower plurality of shared electrodes 1808. Electrical signals from the foam mat 1800—e.g., electrical signals from the first foam sensor 1815—are provided to the analog multiplexer 1822 and then to the analog-to-digital converter 1824. The analog multiplexer 1822 is configured to identify the location(s) on the foam mat 1800 where the electrical signals are being generated and the analog-to-digital converter 1824 is configured to digitize the electrical signals. The digitized electrical signals are then provided to a processor or computer 1830 via a link 1832, which may be a cable or wireless link, for analysis. The data collection system 1820 and the foam mat 1800, as described, may be used, for example, in applications that require measurement of pressure or forces at a large number of discrete locations throughout the foam mat 1800, where a large number of discrete sensor locations translates into a high resolution of pressure or force measurement. Such configurations having high resolution may have many applications, such as, for example, exercise mats for yoga or pressure mats for hospital beds.

Figure 19:
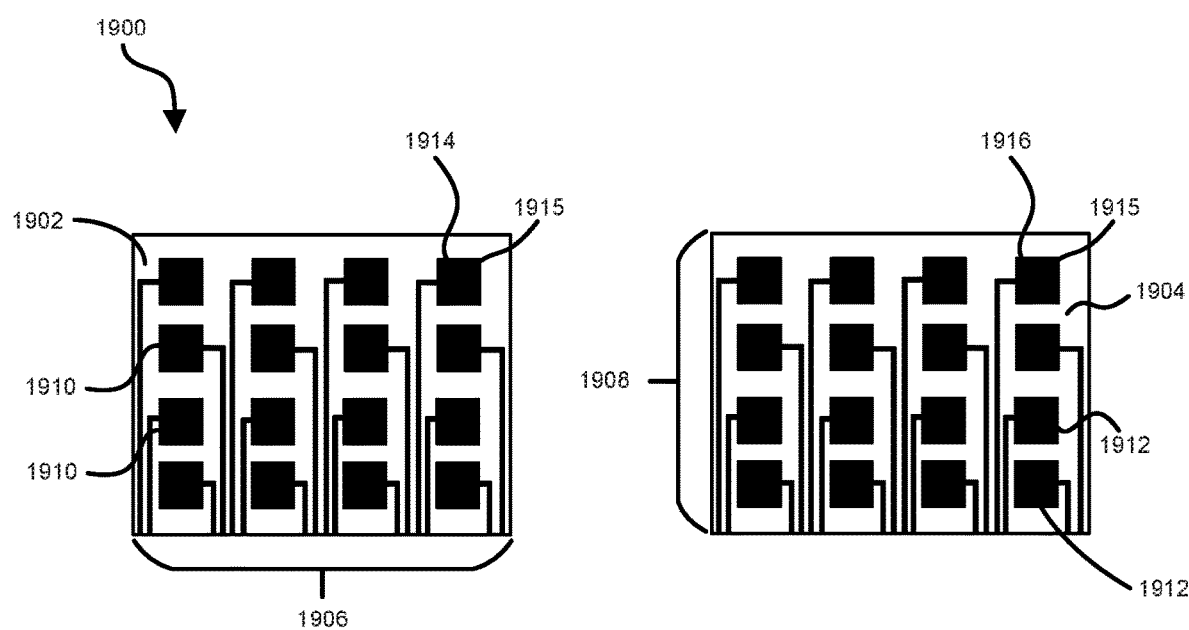
FIG. 19 illustrates a discrete electrode configuration in a mat, in accordance with various embodiments.

Referring now to FIG. 19, an alternative embodiment for the large-area foam mat illustrated in FIG. 18A is provided. Specifically, a foam mat 1900 is illustrated having an upper surface 1902 (or a top surface) and a lower surface 1904 (or a bottom surface). The foam mat 1900 possesses piezoelectric or triboelectric properties throughout a volume of the foam mat, which may include an isolated area of the foam mat or the entire surface area of the foam mat. An upper plurality of discrete electrodes 1906 is distributed on the upper surface 1902 and a lower plurality of discrete electrodes 1908 is distributed on the lower surface 1904. In various embodiments, each of the upper plurality of discrete electrodes 1906 includes an upper electrode pad 1910 and each of the lower plurality of discrete electrodes 1908 includes a lower electrode pad 1912. This configuration enables the foam mat 1900 to include any number of foam sensors (e.g., a first foam sensor 1915) distributed throughout the surface area of the foam mat 1900, with each such foam sensor comprising an upper electrode pad and a lower electrode pad that sandwich a portion of the foam mat. For example, the first foam sensor 1915 comprises a first upper electrode pad 1914 and a first lower electrode pad 1916 and the portion of the foam mat sandwiched therebetween. Because the various electrodes of the foam mat 1900 are discrete, as opposed to shared as described above, individual processors are configured to process the electrical signals generated at one or more of the sensors distributed throughout the foam mat 1900. Similar to the foam mat 1800 described above, a large number of discrete sensors distributed throughout the foam mat 1900 translates into a high resolution of pressure or force measurement.

As mentioned above, while one aspect of the various embodiments described in this disclosure concerns footwear and another concerns large-area mats (e.g., an exercise mat of a or a pressure mat), the disclosure contemplates other applications, such as, for example, controls used to operate various systems, including systems having buttons or joysticks. In various embodiments, for example, the sensors described herein may be used as the basis for a joystick, a game controller or a touch pad, each of which is sensitive to pressure or a directional load from an applied force. A piezoelectric foam, for example, may be used in such a sensor, and be configured for measuring touch, pressure and applied direction. In various embodiments, for example, such sensors may include a shaped piece of foam selectively doped with piezoelectric particles (e.g., at 60% BTO) in the form of concentric circles (or other geometries as disclosed above), poled and with electrodes attached. Or, in various embodiments, a shaped piece of foam is selectively doped with piezoelectric particles having a range of concentrations of BTO doped within concentric circles or custom spatial patterns, such that different areas of the foam are more sensitive to an applied force than others. In various embodiments, concentric electrodes are configured to overlay a uniformly doped foam (e.g., at 60% BTO), such that the electrode shape and their positioning serve as the basis for determining the magnitude and direction of an applied pressure against time.

Other applications of the sensors described herein include buttons. For example, in various embodiments, a piezoelectric foam based push button is configured to provide pressure detection and then to reset, in a very low profile design, which may be incorporated into keyboards, as well as a variety of soft to hard device casings. Such embodiments may be useful, for example, in a mobile phone handset, a pad, a keyboard, a gaming control device, or in other applications where an electronic pressure activated button is required, with minimal footprint inside the device housing. In the case of phones, the button controls may be incorporated into parts of the housing of the phone. Buttons on keyboards may be based on piezoelectric foam to provide opportunities for detecting touch, as well as force level.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A piezoelectric foam, comprising:
    a porous polymer matrix made from a two-part polyurethane system; a mixture of ethylene-vinyl-acetate, polyolefin elastomer, and styrene-10 butadiene-styrene; or a mixture of ethylene-vinyl-acetate, polyolefin elastomer, and styrene-butadiene-styrene; and
    a plurality of piezoelectric particles in the porous polymer matrix, wherein a filler weight of the plurality of piezoelectric particles is a majority of a combined weight of the plurality of piezoelectric particles and the porous polymer matrix.

2. The piezoelectric foam of claim 1, wherein the plurality of piezoelectric particles has a piezoelectrical structure and a size in a range of 100 nanometers to 100 micrometers.

3. The piezoelectric foam of claim 2, wherein the plurality of piezoelectric particles comprises barium titanate microparticles.

4. The piezoelectric foam of claim 1, wherein the filler weight is greater than 65% of the combined weight.

5. The piezoelectric foam of claim 1, wherein the filler weight is less than 65% of the combined weight.

6. The piezoelectric foam of claim 5, wherein the filler weight is in a range of 51% to 65% of the combined weight.

7. The piezoelectric foam of claim 1, wherein the piezoelectric foam is an electrical insulator.

8. A piezoelectric foam, comprising:
    a porous polymer matrix; and
    a plurality of piezoelectric particles in the porous polymer matrix,
    wherein the plurality of piezoelectric particles have a tetragonal crystal lattice structure and a size in a range of 200 to 500 nanometers.

9. The piezoelectric foam of claim 8, wherein a filler weight of the plurality of piezoelectric particles is less than 50% of a combined weight of the plurality of piezoelectric particles and the porous polymer matrix.

10. The piezoelectric foam of claim 9, wherein the filler weight is less than 30% of the combined weight.

11. The piezoelectric foam of claim 10, wherein the filler weight is less than 20% of the combined weight.

12. The piezoelectric foam of claim 8, wherein the porous polymer matrix is made from a two-part polyurethane system; a mixture of ethylene-vinyl-acetate, polyolefin elastomer, and styrene-10 butadiene-styrene; or a mixture of ethylene-vinyl-acetate, polyolefin elastomer, and styrene-butadiene-styrene.

13. A pressure sensing component, comprising:
    a piezoelectric foam including
    a porous polymer matrix; and
    a plurality of piezoelectric particles in the porous polymer matrix, wherein the plurality of piezoelectric particles have a tetragonal crystal lattice structure and a size in a range of 200 to 500 nanometers.

14. The pressure sensing component of claim 13, wherein the porous polymer matrix is made from a two-part polyurethane system; a mixture of ethylene-vinyl-acetate, polyolefin elastomer, and styrene-10 butadiene-styrene; or a mixture of ethylene-vinyl-acetate, polyolefin elastomer, and styrene-butadiene-styrene.

15. A footwear component, comprising:
    a piezoelectric foam including
    a porous polymer matrix; and
    a plurality of piezoelectric particles in the porous polymer matrix, wherein the piezoelectric foam has a piezoelectric coefficient greater than 1 pC/N.

16. The footwear component of claim 15, wherein the piezoelectric coefficient is less than 50 pC/N.

17. The footwear component of claim 16, wherein the piezoelectric coefficient is less than 20 pC/N.

18. The footwear component of claim 17, wherein the piezoelectric coefficient is less than 10 pC/N.

19. The footwear component of claim 15, wherein the porous polymer matrix is made from a two-part polyurethane system; a mixture of ethylene-vinyl-acetate, polyolefin elastomer, and styrene-10 butadiene-styrene; or a mixture of ethylene-vinyl-acetate, polyolefin elastomer, and styrene-butadiene-styrene.

* * * * *